United States Patent
Neel et al.

(10) Patent No.: US 9,591,103 B2
(45) Date of Patent: *Mar. 7, 2017

(54) TRANSACTIONAL AND NON-TRANSACTIONAL DATA FOR MAINTAINING SESSION STATE

(71) Applicant: Oracle International Corporation, Redwood Shores, CA (US)

(72) Inventors: Kevin S. Neel, San Mateo, CA (US); Carol L. Colrain, Redwood Shores, CA (US); Douglas N. Surber, Redwood City, CA (US); Nancy R. Ikeda, Los Altos Hill, CA (US); Stefan Heinrich Roesch, Redwood Shores, CA (US); Tong Zhou, Merrick, NY (US); Jean De Lavarene, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/748,451

(22) Filed: Jun. 24, 2015

(65) Prior Publication Data

US 2015/0326673 A1    Nov. 12, 2015

Related U.S. Application Data

(63) Continuation of application No. 14/231,347, filed on Mar. 31, 2014, now Pat. No. 9,124,670, which is a
(Continued)

(51) Int. Cl.
*G06F 17/30* (2006.01)
*H04L 29/06* (2006.01)
(Continued)

(52) U.S. Cl.
CPC .......... *H04L 67/42* (2013.01); *G06F 11/1443* (2013.01); *G06F 11/1474* (2013.01);
(Continued)

(58) Field of Classification Search
USPC .................................................. 709/227, 238
See application file for complete search history.

(56) References Cited

U.S. PATENT DOCUMENTS 6,041,357 A    3/2000  Kunzelman et al.
6,442,552 B1   8/2002  Frolund et al.
(Continued)

OTHER PUBLICATIONS

European Patent Office, "Office Action", in application No. PCT/US2012/054326, dated Jan. 3, 2013, 11 pages.
(Continued)

*Primary Examiner* — Kim Nguyen
(74) *Attorney, Agent, or Firm* — Hickman Palermo Becker Bingham LLP; Marcel K. Bingham

(57) ABSTRACT

Transactional and non-transactional data for maintaining session state is described. In a session, a server instance receives, from a client, a request to execute transactional commands and non-transactional commands. The server instance sends at least one first directive executable at the client to store, in a first set of information, one or more first items representing one or more particular transactional commands that are open but not yet committed. The first set of information is maintained separately from a second set of information including one or more second items representing one or more particular non-transactional commands that have been processed. Based on committing one or more particular transactional commands, the server instance sends at least one second directive executable at the client to purge, from the first set of information, the one or more first items without purging, from the second set of information, the one or more second items.

20 Claims, 6 Drawing Sheets

Related U.S. Application Data continuation of application No. 13/563,680, filed on Jul. 31, 2012, now Pat. No. 8,725,882, which is a continuation-in-part of application No. 13/229,641, filed on Sep. 9, 2011, now Pat. No. 8,549,154, and a continuation-in-part of application No. 13/448,258, filed on Apr. 16, 2012, now Pat. No. 8,984,170, and a continuation-in-part of application No. 13/448,287, filed on Apr. 16, 2012, now Pat. No. 8,924,346, and a continuation-in-part of application No. 13/542,278, filed on Jul. 5, 2012.

(51) Int. Cl.
*H04L 29/08* (2006.01)
*G06F 11/14* (2006.01)

(52) U.S. Cl.
CPC .......... *H04L 67/142* (2013.01); *H04L 67/146* (2013.01); *H04L 67/148* (2013.01); *H04L 67/327* (2013.01)

(56) References Cited

U.S. PATENT DOCUMENTS

| | | | | |
|---|---|---|---|---|
| 6,728,747 | B1* | 4/2004 | Jenkins | G06F 11/2028 707/999.01 |
| 7,536,462 | B2* | 5/2009 | Pandya | H04L 29/06 709/227 |
| 7,539,746 | B2 | 5/2009 | Bankier et al. | |
| 7,552,218 | B2* | 6/2009 | Kaluskar | G06F 17/30575 709/227 |
| 7,631,107 | B2* | 12/2009 | Pandya | H04L 29/06 370/389 |
| 7,761,435 | B2* | 7/2010 | Stanev | G06F 9/461 707/705 |
| 7,849,173 | B1* | 12/2010 | Uhlik | H04L 12/14 709/223 |
| 7,849,177 | B2* | 12/2010 | Uhlik | H04L 12/14 709/223 |
| 7,853,698 | B2* | 12/2010 | Stanev | G06F 9/4435 709/227 |
| 8,005,966 | B2* | 8/2011 | Pandya | H04L 29/06 709/223 |
| 2003/0028654 | A1 | 2/2003 | Abjanic et al. | |
| 2003/0131045 | A1 | 7/2003 | McGee et al. | |
| 2003/0204769 | A1 | 10/2003 | Coughlin | |
| 2005/0021514 | A1 | 1/2005 | Barga et al. | |
| 2005/0038848 | A1 | 2/2005 | Kaluskar et al. | |
| 2006/0036617 | A1 | 2/2006 | Bastawa et al. | |
| 2007/0067266 | A1 | 3/2007 | Lomet | |
| 2007/0226218 | A1 | 9/2007 | Chatterjee et al. | |
| 2008/0010240 | A1* | 1/2008 | Zait | G06F 17/30463 |
| 2008/0098048 | A1* | 4/2008 | Cao | G06F 17/30306 |
| 2008/0134219 | A1 | 6/2008 | Dorrance et al. | |
| 2008/0228834 | A1 | 9/2008 | Burchall et al. | |
| 2009/0077135 | A1 | 3/2009 | Yalamanchi et al. | |
| 2010/0030818 | A1 | 2/2010 | Cooper et al. | |
| 2010/0042601 | A1 | 2/2010 | Kelley et al. | |
| 2010/0293137 | A1 | 11/2010 | Zuckerman et al. | |
| 2010/0318394 | A1 | 12/2010 | Nayak et al. | |
| 2011/0212783 | A1 | 9/2011 | Dale et al. | |
| 2011/0218981 | A1 | 9/2011 | Retnakumari et al. | |
| 2012/0179645 | A1 | 7/2012 | Lomet et al. | |
| 2013/0066837 | A1 | 3/2013 | Colrain | |
| 2013/0066948 | A1 | 3/2013 | Colrain | |
| 2013/0066949 | A1 | 3/2013 | Colrain | |
| 2013/0066952 | A1 | 3/2013 | Corain | |
| 2013/0066955 | A1 | 3/2013 | Neel | |
| 2013/0297566 | A1 | 11/2013 | Colrain | |
| 2014/0095547 | A1 | 4/2014 | Guo et al. | |
| 2014/0229531 | A1 | 8/2014 | Neel et al. | |

OTHER PUBLICATIONS

Current Claims in application No. PCT/US2012/054326, dated Jan. 2013, 4 pages.
U.S. Appl. No. 13/542,278, filed Jul. 5, 2012, Examiner's Answer, Jan. 29, 2014.
U.S. Appl. No. 13/542,278, filed Jul. 5, 2012, Final Office Action, May 2, 2013.
U.S. Appl. No. 14/231,347, filed Mar. 31, 2014, Office Action, Nov. 19, 2014.
U.S. Appl. No. 14/231,347, filed Mar. 31, 2014, Notice of Allowance, Mar. 17, 2015.
U.S. Appl. No. 13/563,680, filed Jul. 31, 2012, Notice of Allowance, Dec. 23, 2013.
U.S. Appl. No. 13/448,267, filed Apr. 16, 2012, Notice of Allowance, Aug. 14, 2014.
U.S. Appl. No. 13/448,267, filed Apr. 16, 2012, Office Action, Jan. 24, 2014.
U.S. Appl. No. 13/448,267, filed Apr. 16, 2013, Office Action, Jul. 23, 2013.
U.S. Appl. No. 13/448,258, filed Apr. 16, 2012, Notice of Allowance, Oct. 30, 2014.
U.S. Appl. No. 13/448,258, filed Apr. 16, 2012, Office Action, May 27, 2014.
U.S. Appl. No. 13/448,258, filed Apr. 16, 2012 Office, Office Action, Nov. 27, 2013.

* cited by examiner

TRANSACTIONAL AND NON-TRANSACTIONAL DATA FOR MAINTAINING SESSION STATE

CROSS-REFERENCE TO RELATED APPLICATIONS; BENEFIT CLAIM

This application claims the benefit as a Continuation, under 35 U.S.C. §120, of: (1) application Ser. No. 14/231, 347, entitled "Transactional And Non-Transactional Data For Maintaining Session State," filed Mar. 31, 2014, the entire contents of which is hereby incorporated by reference as if fully set forth herein, which claims the benefit as a Continuation, under 35 U.S.C. §120, of: (2) application Ser. No. 13/563,680, entitled "Masking Database Outages From Clients And Applications," filed Jul. 31, 2012, the entire contents of which is hereby incorporated by reference as if fully set forth herein, which claims the benefit as a Continuation-in-part, under 35 U.S.C. §120, of the following applications: (3) application Ser. No. 13/229,641, entitled "Recovering Stateful Read-Only Database Sessions," filed Sep. 9, 2011, the entire contents of which is hereby incorporated by reference as if fully set forth herein; (4) application Ser. No. 13/448,258, entitled "Idempotence For Database Transactions," filed Apr. 16, 2012, the entire contents of which is incorporated by reference as if fully set forth herein; (5) application Ser. No. 13/448,267, entitled "Idempotence For Database Transactions," filed Apr. 16, 2012, the entire contents of which is incorporated by reference as if fully set forth herein; and (6) application Ser. No. 13/542, 278, entitled "Preserving Server-Client Session Context," filed Jul. 5, 2012, the entire contents of which is incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

This application is also related to (1) U.S. Pat. No. 7,747,754, entitled "Transparent Migration Of Stateless Sessions Across Servers," filed Aug. 12, 2004, the entire contents of which is incorporated by reference as if fully set forth herein; (2) U.S. Pat. No. 7,502,824, entitled "Database Shutdown With Session Migration," filed May 1, 2006, the entire contents of which is incorporated by reference as if fully set forth herein; (3) U.S. Pat. No. 7,552,218, entitled "Transparent Session Migration Across Servers," filed Aug. 12, 2004, the entire contents of which is incorporated by reference as if fully set forth herein; (4) U.S. Pat. No. 7,415,470, entitled "Capturing And Re-Creating The State Of A Queue When Migrating A Session," filed May 17, 2005, the entire contents of which is incorporated by reference as if fully set forth herein; (5) U.S. Pat. No. 7,634,512, entitled "Migrating Temporary Data Of A Session," filed Apr. 4, 2007, the entire contents of which is incorporated by reference as if fully set forth herein; (6) U.S. patent application Ser. No. 13/076,313, entitled "Application Workload Capture And Replay System," filed Mar. 30, 2011, the entire contents of which is incorporated by reference as if fully set forth herein.

TECHNICAL FIELD

The technical field relates to recovering in-flight client to server transactional and non-transactional work.

BACKGROUND

Servers and Clients

A server is an operating software process that provides a service to one or more clients. The server may be a server instance of several different server instances of related software that are operating to provide services to clients. Clients communicate with servers on server connections. In particular, clients send commands to servers, and the servers execute the commands and, optionally, send results back to the clients. As used herein, a server "operation" refers to a function, procedure, or other action taken by the server pursuant to executing one or more commands the client. A single command may trigger multiple server operations or may correspond to a single server operation. For example, some commands may request the server to return results in addition to performing a data manipulation function. Other commands may merely request confirmation that data manipulation commands were performed, or may not request any response.

A client may request execution of a set of commands that are specified in the request. In response, the server may execute the set of commands and confirm, to the client, that the set of commands were executed. For example, the server may provide results to the client or may merely provide an indication that the set of commands were executed. The connection between the server and the client may become unavailable at any time, planned or unplanned. For example, the server may fail, or a network device or other resource supporting the connection between the server and the client may fail. If the connection between the server and the client becomes unavailable before the server has responded to a set of commands, the client is unable to determine whether or not the set of commands has been completed.

Database servers and database applications are provided herein as examples of servers and clients, respectively. However, various techniques described herein may apply to any server-client system.

Database Instances

A database comprises data and metadata that is stored on one or more storage devices, such as a hard disk, a stick of random access memory, a cluster or a cloud storage system. Such data and metadata may be stored in a database logically, for example, according to relational and/or object-relational database constructs. A database application interacts with an instance of a database server ("database instance") by submitting, to the database instance, commands that cause the database instance to perform operations on data stored in a database. A database command is a request to access or modify data from a database. The command may cause the database instance to perform operations on the data in the database and/or return the data from the database.

In a multi-node database system, a database may be served by multiple database instances, and each database instance may be configured to access all or part of the database. An instance of a server is a combination of integrated software components, such as one or more processes executing on one or more computing devices, and an allocation of computational resources, such as memory, storage, or processor cycles, for executing the integrated software components on a processor. A database instance is a combination of integrated software components and an allocation of computational resources for accessing, modifying, or otherwise using a database. Database instances may be grouped into logical domains called services. Multiple database instances may be installed or configured on a single machine or on separate machines. When processing database commands, a database instance may access the database or a cache of information from the database. In one example, the database is stored in non-volatile memory, and the cache is stored in volatile memory.

When multiple database sessions share access to the same data, user commands executed in a session may lock a portion of the database while the portion is in use by a database instance serving the session. For example, the user session may lock the portion for exclusive read and/or write access, and other user sessions are prevented from accessing and/or modifying the portion while the portion is locked. The user session then releases the lock when the database instance is finished accessing and/or modifying that portion of the database. After the lock is released, other instances may access and/or modify the portion or obtain a lock on the portion.

Database commands may be submitted to a database instance in the form of database statements that conform to a database language supported by the database instance. One non-limiting example of a database language supported by many database instances is a Data Manipulation Language ("DML") called Structured Query Language ("SQL"), including proprietary forms of SQL supported by such database servers as Oracle®, (e.g. Oracle® Database 11 g). SQL data definition language ("DDL") instructions are issued to a database server to create or configure database objects, such as tables, views, or complex types. Although SQL is mentioned as one example, there are many other example database languages and exposed interfaces to the database, any of which may be used in conjunction with the techniques described herein.

Procedural Language/Structured Query Language ("PL/SQL") extends SQL by providing constructs found in procedural languages, resulting in a structural language that is more powerful than standard SQL. PL/SQL commands are organized into blocks of variable declarations, sub-commands that include procedural and SQL commands, and exception-handling commands. PL/SQL commands may be sent to a database server to cause the database server to perform a variety of actions as the PL/SQL commands are executed. The database server may also receive and execute Java-based commands, remote procedure call commands, or commands that conform to other programming languages or constructs.

Multiple database commands may be sent from a database client to the database instance in a single request to perform work. The database commands may be processed by the database instance, and the database instance may return results to the database client in a single response to all commands that were submitted in the request. Handling multiple commands in a single roundtrip request and response may result in an efficient use of database connections. In other words, clients generally use database connections to submit requests less frequently when multiple commands are allowed to be submitted on the requests that use the database connections.

Applications and Logical Connections

Servers, such as mid-tier servers, provide database instance connections to applications that request information from a database. A mid-tier server is a server that provides access to one or more database servers, distributes work to one or more database servers, or manages connections to one or more database servers. An application is any logic running on one or more computing devices that uses a database connection to retrieve information from the database. The retrieved information may be presented or displayed to a user of the application. For example, the application may be accessed from a browser, where the application receives input from the user and presents information to the user. The application may be an application that is accessed through a web portal, over a network, by the user, an application that is installed on a machine of the user, or an application that is distributed among multiple machines.

In one example, an Oracle® Fusion® Application is specially configured to retrieve data from an Oracle® database, and display the information to a user of the Fusion® Application. Applications other than Oracle® Fusion® Applications currently exist, and other database applications may be developed in the future without departing from the present disclosure.

In one example, an application issues a request to a mid-tier server for data from a database. The request may or may not be sent in response to user input. The mid-tier server selects a free connection from amongst the freed connections in the pool to database instances. A database connection that has been selected and/or customized for use by a client or group of clients is referred to herein as a "database session." A database connection may be customized to meet particular needs as a database session for a particular client, or the connection may be generalized such that the connection can be used to support a variety of database sessions for a variety of clients. The mid-tier server sends the client request on the selected connection to a database instance, and the database instance accesses a database to handle the request. The database server processes the request by retrieving or modifying data in the database or by retrieving or modifying the data in a cache of data from the database. The database server establishes state for the database session as the database server processes the request.

Mid-tier servers often maintain connection pools, which include connections to database instances. The connection may refer to either a physical mechanism, such as a physical port, or a logical configuration, or both. There may be a one-to-one mapping of logical connections (i.e., database sessions) to physical connections. On the other hand, there may be more than one logical connection associated with a single physical connection. In one example, the free connections in the connection pool include only those connections that are not allocated to applications for processing requests. As work completes, connections are returned to the connection pool and are available for subsequent applications to borrow from the pool.

Effect of Database Session Unavailability on the Application

As an application uses a database session to access a database, the application builds up state on the database session. For example, application uses the database session to obtain locks, create temporary variables or database objects, establish user-specific information, establish application-specific information, establish cursor information, create temporary arrangements or selections of data, and/or perform other partially completed operations on data for further processing in the database session. If the database session fails before the further processing occurs, the locks, temporary variables or database objects, user-specific information, application-specific information, cursor information, temporary arrangements or selections of data, and/or the partially completed operations become unavailable to the application, even if the application attempts to reference this information in a new database session.

In one example, the database session may fail or otherwise becomes unavailable if a database instance upon which the database session depends fails or otherwise becomes unavailable. In most cases, failure of the database session causes the application to fail as the in-progress database session is lost. The application's user must restart the application or components of the application and start over with logging in, opening cursors and retrieving data, obtaining locks, creating temporary variables or database objects, establishing user-specific information, establishing application-specific information, establishing cursor information, creating temporary arrangements or selections of data, and/or partially completing operations on data for further processing in the database session. In one example, upon failure of the database session, the user may be left hanging with a blue screen or interrupted with an error message.

In prior client-server systems, if there is a break between the client and the server, the client sees an error message indicating that the communication failed. This error does not inform the client whether the submission executed any commit operations or if a procedural call, ran to completion executing all expected commits and session state changes or failed part way through or yet worse, is still running disconnected from the client.

If the client wanted to know whether the submission to the database was committed, the client could have added custom exception code to query the outcome for every possible commit point in the application. Given that a system can fail anywhere, this is impractical in general as the query must be specific to each submission. After an application is built and is in production, this is completely impractical. Moreover, a query cannot give an accurate answer because the transaction could commit immediately after that query executed. Indeed, following a communication failure, the server may still be running the submission not yet aware that the client has disconnected. For a PL/SQL or Java operation, or other procedure submitted to the database, there is no record as to whether the procedural submission ran to completion or was aborted part way through. While it may have committed, subsequent work may not have been done for that procedure.

Failing to recognize that the last submission has committed or shall commit sometime soon or has not run to completion can lead to duplicate transaction submissions and other forms of "logical corruption" as users and software might try to re-issue already persisted changes.

Existing technologies do not provide information about the work that was being executed by the resource when the resource became unavailable. For example, the application is not aware of the outcome of the last operation being processed by the resource in case of outages, planned or unplanned. If a server goes down while executing a set of commands, and before the server sends a response to a client for the set of commands, the client is unaware of whether the set of commands was executed by the server before the outage. Even highly complex applications may expose outages to the end users.

Users experiencing resource outages may be frustrated and may lose revenue due to missed business opportunities, decisions made using bad data, troubleshooting expenses, and lost time in restarting the application or redoing the work. Some applications warn the user not to hit the submit button twice, and, when not the warning is not heeded by users, duplicate transactions may be created if both submissions are allowed to complete.

In another example, once the database session has failed, the user may be prevented from entering any information or causing any commands to be submitted to the database before the page is reloaded. Also, reloading the page without checking what data was stored to the database could lead to a duplicate submission. The application may prevent the user from submitting any commands that depend on the state that was lost in the failed database session or may misbehave if needed information is no longer available. In a particular example, fields already presented to the user may be grayed to indicate that, in order to avoid corrupting data stored in the database, the fields can no longer be modified by the application.

Even if the database session fails over to a second database instance, the second database instance may not have any information about the database session beyond what was committed to the database prior to the failure. In order to avoid corrupting the data in the database, applications may reset the information that is displayed to the user to information that matches the data already committed to the database. In other words, when a database instance fails, a user may lose temporary information that would have been available to the user just prior to the failure. Some of the lost information may correspond to information that was being displayed, modified, selected, or arranged by the application and/or user that was using a now unavailable database session, or information that was about to be returned to the application and/or user on the now unavailable database session. The user is often forced to re-enter fields of data again.

The loss of information already entered, modified, selected, and/or arranged by a user may result in user frustration and wasted time in re-entry, re-modification, re-selection, and/or re-arrangement of the information after the application or application component has restarted. The lost information may be information that was retrieved by the user from others, for example, by video, voice, email, or text message. In some cases, the lost information may no longer be retrievable. Losing information can be particularly costly when the user is being assisted by a support service provider as the failure occurs. Loss of information may require further communications with the support service provider, or may even cause the user to lose faith in the reliability of the application, the mid-tier server, or the database server, or the company that provides the application, the mid-tier server, and/or the database server. Further, the user may be selecting, entering, or modifying time-sensitive information prior to failure. Requiring the user to re-enter the time-sensitive information after the failure may result in a delay that causes loss of business, value, or reputation of the user to business clients or business ventures of the user. Requiring re-entry may also result in a loss of opportunity for the user. For example, the user may miss out on items or opportunities that the user had previously selected.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Fast Application Notification

Application developers develop applications that deal with reported outages of underlying software, hardware, underlying communication layers, or other resources in a server-client system. For example, since Oracle 10g, Fast Application Notification ("FAN") delivers notifications to applications when a resource comes up (i.e., becomes available) or goes down (i.e., becomes unavailable), and application developers may customize their applications to change application behavior in response to the notifications.

DETAILED DESCRIPTION

Figure 1:
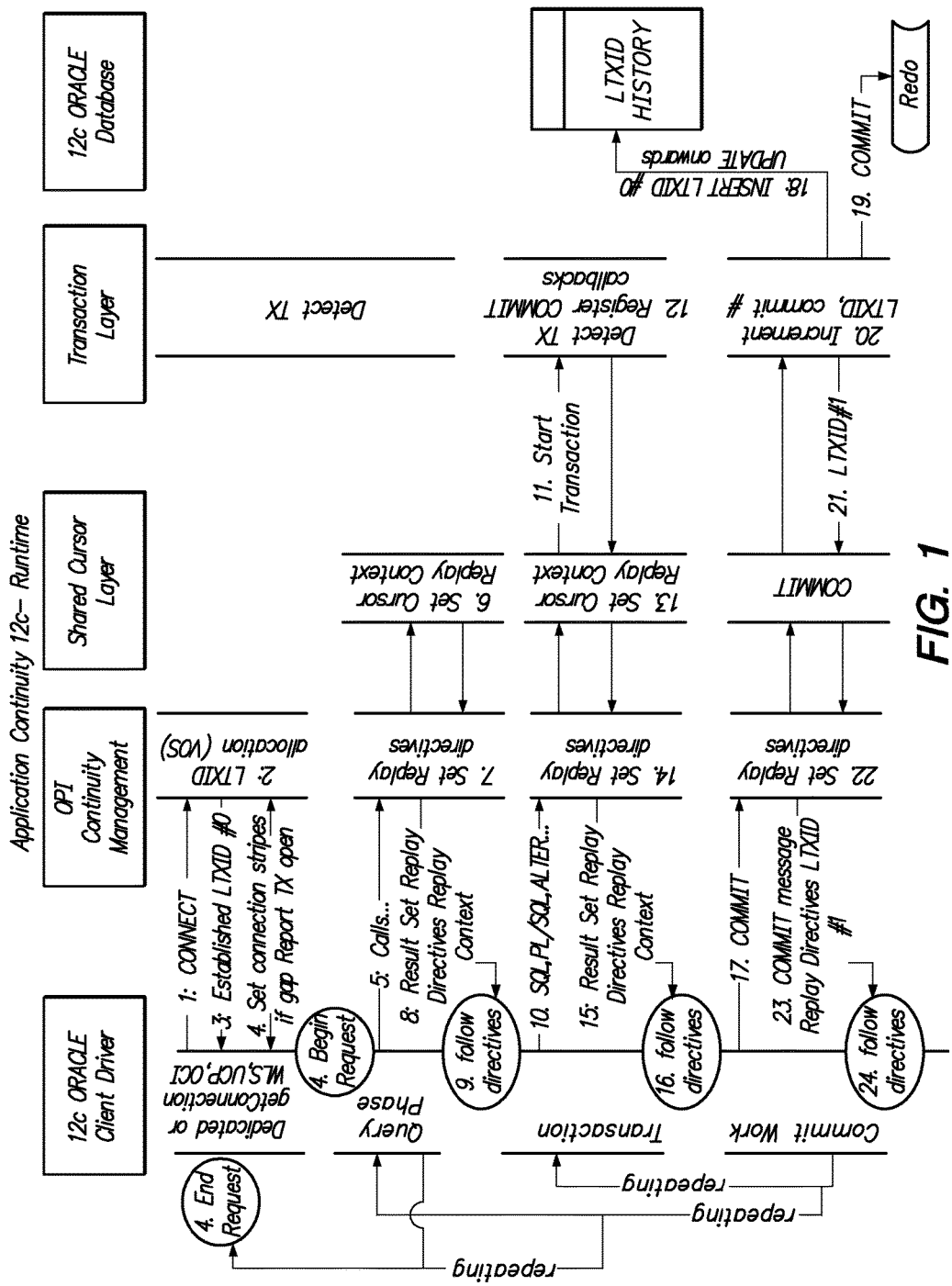
FIG. 1 shows an example server-client workflow for recording work at replay driver level, directing the driver, managing replay context, and achieving transaction idempotence.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are disclosed herein for recovering the state of a database session. The techniques can also be used to determine whether a transactional set of commands has completed or partially completed. For example, a set of commands may be partially completed if transaction(s) have committed but other transaction(s) have not committed, if there was more information to return with a commit outcome for the set of commands, or if there was otherwise more work to do by the server to complete the set of commands. Although the techniques may be described with reference to specific embodiments, the functionality described herein may be provided by the performance of a method performed by specialized software and/or hardware operating on one or more computing devices, by a set of one or more stored instructions that, when executed, cause performance of the method, or by a set of one or more machines configured with specialized hardware and/or software to perform the method.

Using techniques described herein, state that was built up on a first database session between a first server instance and a client may be restored to a second database session between a second server instance and the client. State that affects execution of commands in a session but is not persisted to the database is called non-transactional session state. Non-transactional session state, such as variables, objects, references, and settings that were created for the first session, may be preserved by repeating non-transactional commands in the second session. Transactions may be executed in the second session only when the transactions did not commit in the first session.

In one embodiment, a first server instance sends, to a client in a first session between a first server instance and the client, information to maintain for a possible replay of command(s) that were sent in a request to the first server instance for execution in the first session. If the first session becomes unavailable or if the client otherwise wishes to re-establish state of the first session to a second session, the command(s) may be replayed in the second session between a second server instance and the client. If replayed in the second session according to the maintained information, the command(s) would re-establish a state that was established between the first server instance and the client in the first session, without re-making any changes to a database that were already made in the first session. If the command(s) had been fully executed or partially executed in the first session, the command(s) may have caused the first server instance to commit transaction(s) to make changes to the database. In one embodiment, the command(s) did cause the first server instance to complete transaction(s) to make change(s) to the database.

Figure 4:
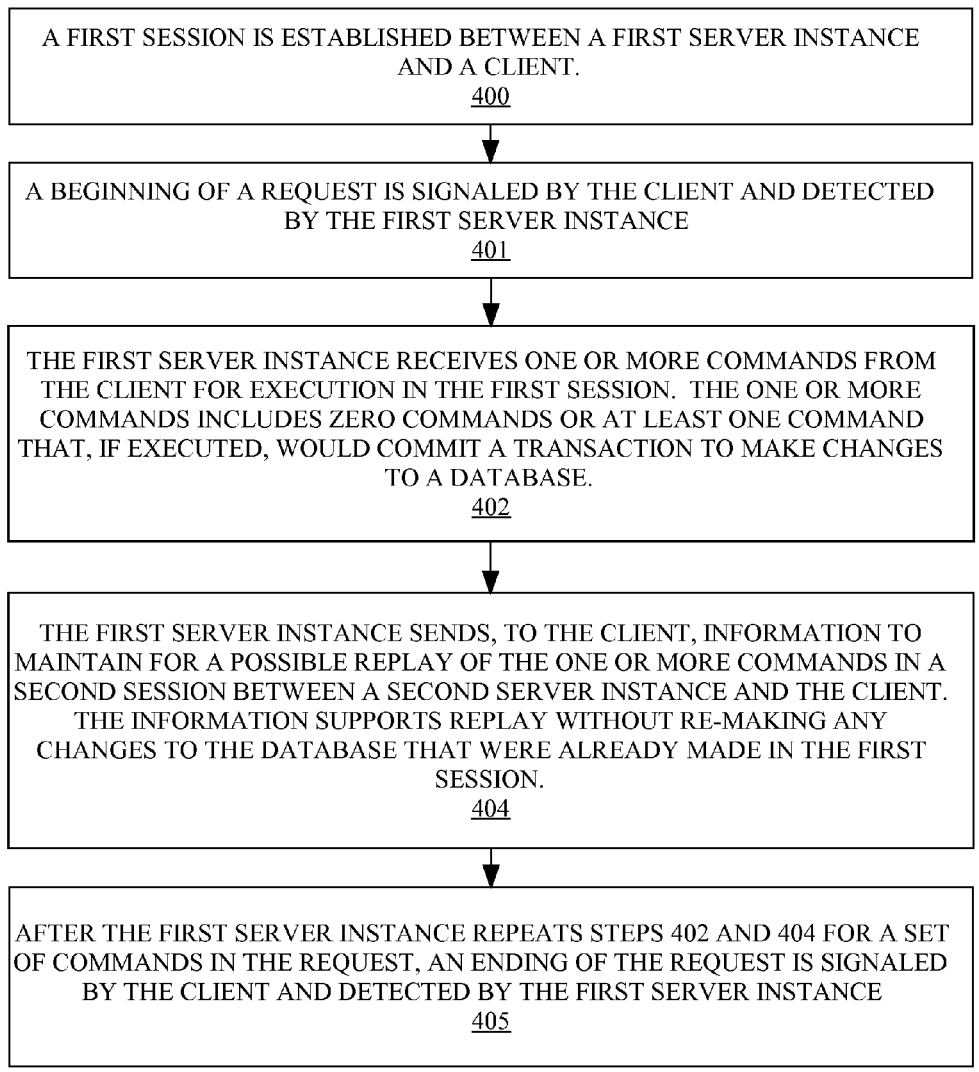
FIG. 4 shows an example computer-implemented method for directing a client to store information to maintain for a possible replay of commands that may or may not be transactional.

FIG. 4 shows an example computer-implemented method for directing a client to store information to maintain for a possible replay of commands that may or may not be transactional. In step 400, a first session is established between a first server instance and a client by checking the first session out from a connection pool and/or marking the session to begin request(s). A beginning of a request is signaled by the client and detected by the first server instance in step 401. In step 402, the first server instance receives one or more commands from the client for execution in the first session. The one or more commands include zero commands or at least one command that, if executed, would commit a transaction to make changes to a database. The first server instance sends, to the client in step 404, information to maintain for a possible replay of the one or more commands in a second session between a second server instance and the client. The information supports replay without making any changes to the database that were already made in the first session. The first server instance may repeat steps 402 and 404 for a set of commands in the request. After the first server instance repeats steps 402 and 404 for the set of commands in the request, an ending of the request is signaled by the client and detected by the first server instance, in step 405. To signal the end of the request, the session may be returned to the connection pool, and/or the request may be marked as ended.

The first server instance may direct the client to maintain information by sending the client directive(s), and the maintained information may be used by the second server instance to restore the state of the first database session to the second database session. In one embodiment, the directives may be piggybacked on messages sent between the client and the first server instance. For example, directive(s) may be piggybacked on message(s) that include result(s) of executing command(s) in the first session. Example directives include, but are not limited to, "place in queue N," "disable replay," and "purge queue N".

A request is a unit of work submitted from the application to a server instance on a database session. The request may include or reference database commands such as SQL and PL/SQL, and other database calls of a single web request on a single database connection. The request may be demarcated by the calls made to check-out and then check-in the database connection from a connection pool.

In one embodiment, a mid-tier server assigns a logical connection to an application that is requesting access to the database. The logical connection is mapped, directly or indirectly, to one of a plurality of physical connections. The logical connection may be re-assigned to new physical connections without re-assigning a new logical connection to the application. The logical connection may be exposed to the application, and the application may continue to reference the same logical connection as the underlying physical connections change. In one example, a particular logical connection is represented as a connection object that is exposed to the application and that is mapped to another connection object, which may or may not be exposed to the application, and which may or may not be another logical connection. Through a hierarchy of logical connections, the particular logical connection is mapped to a physical connection.

In one embodiment, the first server instance causes the client to maintain information associated with transaction(s) in a different queue or storage location than information that is not associated with the transaction(s). In this manner, information about transaction(s) may be purged or cleared as the transaction(s) are completed so long as the commands on the transactional queue also did not alter non-transactional state that is used by later commands. For example, the first server instance may direct the client to store a first set of information related to transaction(s) in a first queue and a second set of information not related to the transaction(s) in a second queue. When the transaction(s) are completed, the first server instance may direct the client to purge or clear the information stored in the first queue dependent on how state that was not persisted was changed and used. If attempting to restore state to the second session, the client may replay some commands without replaying other commands that were cleared prior to replay.

In one example, the first server instance causes the client to maintain separate sets of information for transactional and non-transactional statements that were executed in the first session. In the example, a first set of information may identify statement(s) that made temporary change(s) that have not yet been made permanent in the database. When the temporary change(s) are made permanent or committed to the database, the first server instance may efficiently instruct the client to purge or clear the first set of information if these statements also did not make non-transactional state changes. The second set of information may identify statement(s), such as non-transactional statements, that were executed before or after transaction(s) that completed in the first session and so is not part of the transaction. Dependent on the mode of operation detected, purging the first set of information may leave the second set of information intact at the client, such that the non-transactional statements identified in the second set of information may still be available for replay. Replaying the non-transactional statements in the second set of information may cause a second server instance in a second session to re-establish non-transactional state that was originally established in the first session or would have been established in the first session if the set of commands sent by the client in the request had been executed to completion.

Conversely, if the statements in the first set of commands, namely the transaction, also made non-transactional state changes, then, when that transaction committed the first and second sets of information replay could be disabled and both queues purged. These statements inside the transaction may set state that is not persisted in the database and cannot be restored after the transaction committed unless a third set of commands is retained. For example, a variable may be defined after an INSERT or UPDATE statement, but before the INSERT or UPDATE has been committed to the database. Purge and disable can be used to avoid the risk of referencing missing information when attempting to rebuild the non-transactional state and to avoid the risk of duplicating a transaction. Replaying is not valid in this second case because it would involve replaying a committed transaction unless that state is rebuilt without persisting the transactional state such as by using a third set of commands.

In one embodiment, commands might not be placed into any queue. For example, a SELECT statement might not be needed for replay if the information requested by that SELECT is meta-data that would be acquired again at replay. These commands may be queued on an as-needed basis if they are needed for replay. Commands may be purged from the queue as the request executes because all data has been returned from them and they are not needed to build non-transactional state.

A session is defined to have a static state if all session state changes (e.g. NLS settings, PL/SQL package state) occur as part of initialization, or otherwise outside of all transactions, and can be encapsulated in a callback at failover. If the client is operating in a static mode, then the application does not later rely on or reference information that was set by non-transactional statements that executed during committed transactions, or will not make non-transactional changes after the request has been initialized. State created during a transaction that was not persisted does not need to be restored to the second session if the transaction has completed because, once the transaction has committed, the later commands do not rely on or reference the information. Because the later commands do not rely on non-transactional information set inside the transaction, the information stored in the transactional queue may be cleared from the transactional queue safely when the transaction commits. This type of application is often referred to as database agnostic. It does not change PL/SQL variables or other constructs that change non-transactional state during the request execution.

A session is defined to have dynamic state if the session state changes are not fully encapsulated by the initialization and cannot be fully captured in a callback at failover, but rather are included within the request. If the application is operating in dynamic mode, then the application may or may not rely on or reference information that was set by non-transactional statements that executed during transactions. Because a transaction that was already executed in a first session cannot be repeated in a second session, non-transactional statements nested within the transaction might not be available for replay in the second session after a transaction commits and completes unless a third set of commands is maintained.

Static state may be detected if non-transactional state not was changed within a request. For static mode, after a commit, the transaction queue is purged and replay can continue. Dynamic state may be detected if non-transactional state was changed within a request. Dynamic state is further characterized as to whether non-transactional state changed during a transaction that committed was later referenced by a command after that transaction committed.

In one embodiment for static state, the first server instance receives a request to execute commands and, before or during execution of the commands, detects that a transaction in the request includes not only transactional commands that commit changes to the database, but also commands that change a state of the session but may not commit any changes to the database. Not all requests include transactional commands, let alone transactional commands that set non-transactional session state. Many applications by default do not set non-transactional session state in transactions or at least agree not to rely on (or later use) any non-transactional session state that was set during transactions. Transactions that do not set non-transactional session state may be purged as they are completed such that these transactions are not repeated.

In one embodiment for dynamic state, upon detecting that a committed transaction sets non-transactional session state, the first server instance may then determine whether or not later commands in that request use the non-transactional session state. If later commands in the request do not use the non-transactional session state, then the non-transactional session state may be purged with the transaction on or after completion of the transaction. The purging occurs when the first server instance sends an instruction to the client to delete information about the transaction, which may be stored in a first data structure such as a queue. In this scenario, because the state and the transaction are purged, and because the state is not used by later commands in the request, commands in the request may be replayed without rebuilding the state and without repeating the transaction.

In one embodiment for dynamic state, if later commands in the request may use the non-transactional session state, then the non-transactional session state cannot be purged along with the transaction when the transaction is completed. In this case, the first server instance may send information to the client that describes command(s) that, if executed, would set the non-transactional session state without repeating the transaction. In one example, these commands may include many or all commands from the transaction without taking locks and excluding commit operation(s). In other words, even though the transaction has completed, the first server instance may send, to the client, the commands of the transaction followed by a rollback operation. The commands may be further processed to execute no transactional actions such as taking out locks on shared data objects in the database, modifying data, and also do not violate integrity constraints.

In one embodiment for dynamic state, if later commands in the request may use the non-transactional session state, and if the non-transactional session state cannot be restored without committing the transaction, then the first server instance determines a checkpoint at which a later command may rely on the non-transactional session state. The server may instruct the client to record specialized commands that did not appear in the transaction but that are useable by a second server instance to restore the non-transactional session state change made by the transaction. In one example, the state is recorded as a full or delta of the state change made by the transaction using transparent session migration. This state change may be represented by one or more commands that effectuate the state change without repeating any transactions.

For dynamic state, consider an example where a request includes SELECT, INSERT, ALTER, PL/SQL, COMMIT, and SELECT statements, in that order. The first SELECT may be placed in a non-transactional queue. The INSERT may be placed in a transactional queue along with the ALTER and PL/SQL, which was executed during the transaction. Execution of the COMMIT causes the transactional queue to be cleared when operating in static mode. If the ALTER and PL/SQL made only non-transactional changes these may be placed into the non-transactional queue. This process leaves the transactional queue empty and the first SELECT, PL/SQL and ALTER in the non-transactional queue.

In another example, if non-transactional state changed within the transaction and the commands cannot be located to the non-transactional queue then in one embodiment, the server instance may direct the client to purge all queues and disable replay until the end of the request. Replay would be re-enabled when the next request begins. Replay is disabled only when a non-transactional state change is detected inside a transaction that successfully commits and that non-transactional state is relied on by a later command. Replay is disabled either at the commit, or at the command that relies on that state. Most requests contain no more than one commit and have commit as the last statement, and, at least in these cases, disabling is not an issue. Disable is an effective technique for web requests as it incurs no burden at runtime.

For requests that execute commit and if an outage occurs immediately after the commit executes but the commit outcome and directives are not received by the client, then replay returns the committed state. In this way the user or application does know the outcome of the last transaction. When using static state, the transaction queue is purged and capture for that request continues until the request ends. When using dynamic state, after a successful commit replay is either disabled or a third set of commands is maintained to restore that state.

In one embodiment, a second server instance receives, from a client in a second session between the second server instance and the client, information that was maintained for a possible replay, in the second session, of command(s) that were sent in a request from the client to a first server instance for execution in a first session. The second server instance replays the command(s) in the second session according to the information maintained by the client to re-establish a state that was established between the first server instance and the client in the first session, without re-making any changes, to a database, that were already made in the first database session. If the command(s) had been fully executed or partially executed in the first session, the command(s) may have caused the first server instance to complete transaction(s) to make changes to the database. In one embodiment, the command(s) did cause the first server instance to complete transaction(s) to make change(s) to the database.

Figure 5:
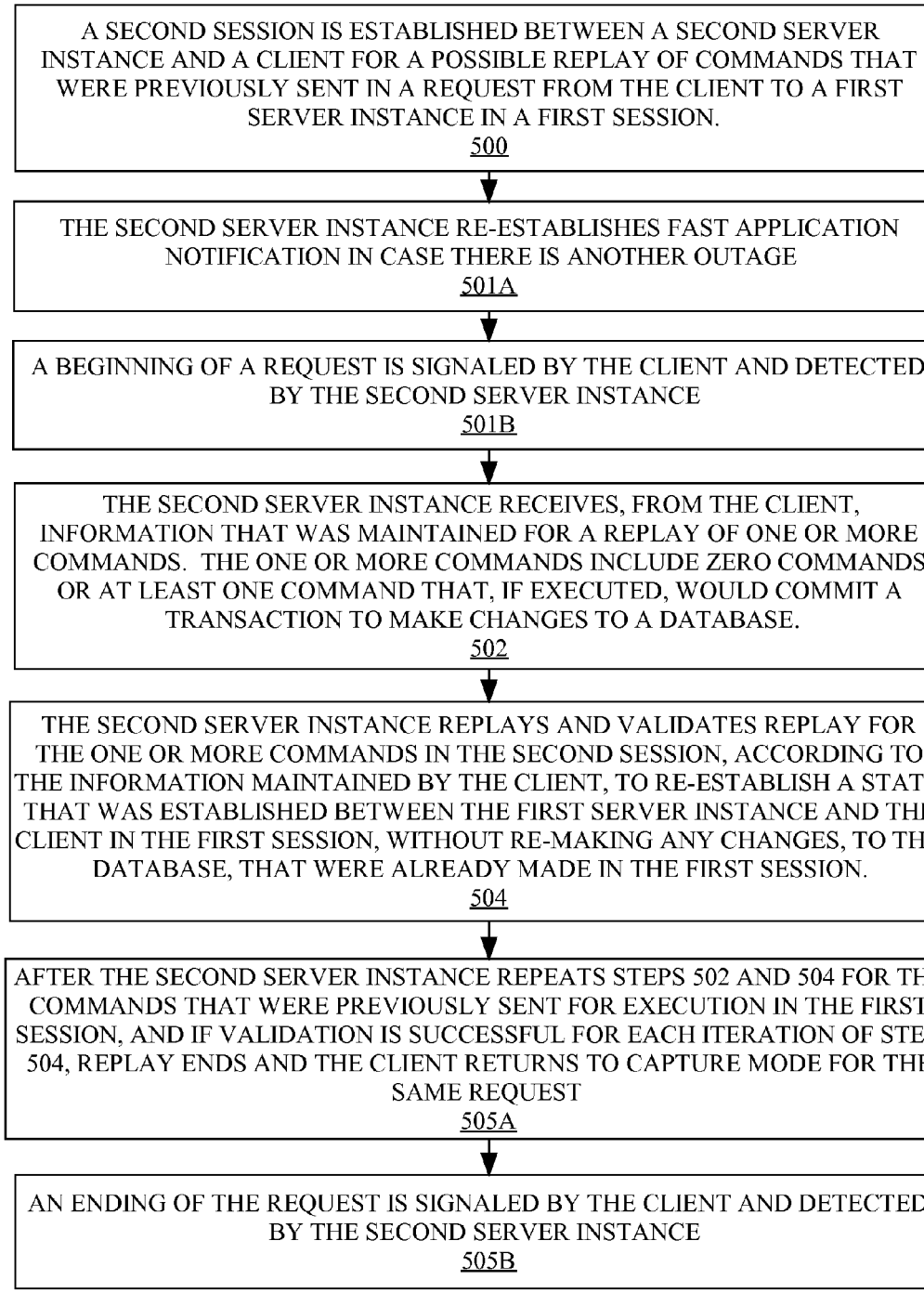
FIG. 5 shows an example computer-implemented method for receiving information from a client to replay commands that may or may not be transactional.

FIG. 5 shows an example computer-implemented method for receiving information from a client to replay commands that may or may not be transactional. FIGS. 4 and 5 can be performed separately or together. In step 500, a second session is established between a second server instance and a client for a possible replay of commands that were previously sent in a request from the client to a first server instance in a first session. In step 501A, the second server instance may re-establish fast application notification in case there is another outage. In step 501B, a beginning of a request is signaled by the client and detected by the second server instance. The second server instance receives, from the client in step 502, information that was maintained for a replay of one or more commands that were sent in a request from the client to a first server instance in a first session. The one or more commands include zero commands or at least one command that, if executed, would commit a transaction to make changes to a database. In step 504, the second server instance replays and validates replay for the one or more commands in the second session, according to the information maintained by the client, to re-establish a state that was established between the first server instance and the client in the first session, without re-making any changes, to the database, that were already made in the first session. Steps 502 and 504 may be repeated for the commands that were previously sent for execution in the first session. After the second server instance repeats steps 502 and 504 for the commands that were previously sent for execution in the first session, and if validation is successful for each iteration of step 504, replay ends and the client returns to capture mode for the same request in step 505A. In step 505B, an ending of the request is signaled by the client and detected by the second server instance.

In one embodiment, the information received for replay includes different sets of information, one set associated with transactions(s) that were not completed or committed in the first database session and another set not associated with the transaction(s). Information associated with transaction(s) that were completed or committed in the first session may be purged as the transaction(s) are completed. In other words, information associated with completed transactions might not be included in the information received for replay.

In one embodiment, the second server instance receives separate sets of information for transactional and non-transactional statements that were executed in the first session. For example, a first set of information may identify statement(s) that made temporary change(s) that have not yet been made permanent in the database. When the temporary change(s) are made permanent or committed to the database, the client may purge or clear the first set of information. The second set of information may identify statement(s), such as non-transactional statements, that were executed before or after transaction(s) that completed in the first session. Purging the first set of information may leave the second set of information intact at the client, such that the non-transactional statements identified in the second set of information may still be available for replay. Replaying the non-transactional statements in the second set of information may cause a second server instance in a second session to re-establish non-transactional state that was originally established in the first session or would have been established in the first session if the set of commands sent by the client in the request had been executed to completion.

In one embodiment, the first set of information that is cleared as transaction(s) are committed may also identify functions or statement(s) that were executed during the transaction(s) even if those statement(s) did not make any changes to the database. These statements may set state that is not persisted in the database but may have remained in the first database session after the transaction(s) have completed. If the client is using static state, this information may be stored in the transactional queue and safely be cleared from the transactional queue as the transaction completes. On the other hand, if the client is using dynamic state, then the non-transactional information may be lost when the transaction is cleared. To avoid the risk of relying on missing non-transactional information, replay is disabled until the end of the request safely eliminating any possibility of logical corruption. In one embodiment, the second server instance may attempt to replay non-transactional commands even if the non-transactional commands were nested within a transaction, modifying the commands as necessary to ensure that the proper dependencies are in place to support execution of the non-transactional commands and also to ensure that the second server instance does not re-perform any transactions that were already performed in the first session. In this embodiment while the commands ran inside the transaction they were placed on the non-transactional queue so as to not be purged.

During replay, each replayed command is validated. The incoming command must have the right security, the right protocol, and right environment. After execution, all results returned to the client must be exactly the same as they were during the first execution. This includes rows, and row order, out binds, error codes and error messages. Every piece of information that the application or client potentially made a decision on must be exactly the same as they were during the original execution. If any value that is placed on the wire from server to client changes from the original then replay is rejected and the client sees the original error. Conversely, if the client executes server side code that does not return results to the client, then the client trusts this code execution and the results may differ without consequence. In this embodiment, the returned values are checked against a checksum such as a CRC calculated at original and replay. The cost of the checksum is offloaded to hardware when hardware support is available.

Before and after replay, the relevant non-transactional environment must be correct for replay to succeed. That is, settings such as the decimal point position, the language, the currency, the sys_context and so on can each impact stored results and must be the same as original execution. Checks occur before an execution to ensure that the call to be replayed has the correct environmental state, and after execution, as the current call may be the last call for which the client holds information, and the next call must execute in the right environment. In this embodiment, the environment is checked against an environment hash value. If any check fails, the replay is rejected and the original error is returned.

In one embodiment, commands are replayed by the second server instance at the original system change number ("SCN"), or logical time that the commands were executed by the first server instance, until a command is reached that cannot be replayed at the original SCN. From that point forward, commands are replayed at the current SCN. As commands are replayed, client-visible results from replay are compared to client-visible results obtained during runtime, as indicated in the replay context.

In one embodiment, the second server instance receives, from the client, information that describes command(s) that, if executed, would set non-transactional session state that was set during a transaction completed in the first session, and the second server instance uses this information to rebuild the non-transactional session state in the second session without repeating the transaction. In one example, these commands may include many or all commands from the transaction and/or operations that would lock any shared data. The information may describe specialized commands that did not appear in the transaction that completed in the first session but that are nonetheless useable by the second server instance to re-establish the non-transactional session state.

In one embodiment, if later commands in the request may use the non-transactional session state, and if the non-transactional session state cannot be restored without committing the transaction, then the second server instance also receives, from the client, a checkpoint at which a later command may rely on the non-transactional session state. When the second server instance reaches the checkpoint during replay, replay is disabled and the transaction is not repeated. In one example, the state was recorded using transparent session migration, taking full state or a delta of the state changed by the transaction. This state change may be represented by one or more commands that effectuate the state change without repeating any transactions.

Mutable Functions and Replaying

When a request is replayed, the default and desired treatment of mutable objects can vary. A mutable function is a function that obtains a new value each time that it is called. The new value may vary each time that function is called. An example of a mutable is a call to SYSTIMESTAMP function. Client applications being recovered after an outage can determine whether to keep or ignore the result of a mutable function if the request is replayed.

Mutable function values may be kept for SYSDATE, SYSTIMESTAMP, CURRENT_TIMEZONE, SYS_GUID, and sequence.NEXTVAL. Mutable values may also be kept for many other mutable functions such as MIN, MAX, CURRENT_TIMESTAMP, LOCAL_TIMESTAMP and so on. If the original values are not kept and if different values for these mutable functions are returned to the client, replay will be rejected because the client may see different results. If the application can use original values, the application can configure the behavior of mutable functions using the new KEEP clause for owned sequences and GRANT KEEP for other users. Sequence values may be kept at replay for many applications to provide bind variable consistency.

Table 1.1 shows examples of the treatment of mutable functions by products during replay. (Actual implementation depends on specific products and releases.)

TABLE 1.1

Example Treatment of Mutable Objects by Products During Replay

| Mutable function | Product 1 | Product 2 | Product 3 |
| --- | --- | --- | --- |
| SYSDATE, SYSTIMESTAMP | Original | Original | Current |
| Sequence NEXTVAL and CURRVAL | Original | Original | (Not applicable) |
| SYS_GUID | Original | (Not applicable) | (Not applicable) |
| LOB access | Fail on mismatch | (Not applicable) | (Not applicable) |

To allow replay to keep and use original function results at replay:
  The database user running the application may have the KEEP DATE TIME and KEEP SYSGUID privileges granted, and the KEEP SEQUENCE object privilege on each sequence whose value is to be kept. For example:
  grant KEEP DATE TIME to user2;
  grant KEEP SYSGUID to user2;
  grant KEEP SEQUENCE on sales.seq1 to user2;
  Note that GRANT ALL ON <object> does not include (that is, does not grant the access provided by) the KEEP DATE TIME and KEEP SYSGUID privileges and the KEEP SEQUENCE object privilege.
  Do not grant DBA privileges to database users running applications for which replay is to be enabled. Grant only privileges that are necessary for such users.

Sequences in the application may use the KEEP attribute, which keeps the original values of sequence.NEXTVAL for the sequence owner, so that the keys match during replay. Sequence values are kept at replay for many applications. The following example sets the KEEP attribute for a sequence (in this case, one owned by the user executing the statement; for others, use GRANT KEEP SEQUENCE):

SQL>CREATE SEQUENCE my_seq KEEP;
SQL>—Or, if the sequence already exists but without KEEP:
SQL>ALTER SEQUENCE my_seq KEEP;

Note that specifying ALTER SEQUENCE . . . KEEP/NOKEEP applies to the owner of the sequence. It does not affect other users (not the owner) that have the KEEP SEQUENCE object privileges. If NOKEEP is specified, the KEEP SEQUENCE object privilege is not granted to these users (or it is revoked from each if it has been granted to them).

To keep function results (for named functions) at replay, the DBA grants KEEP privileges to the user invoking the function. This security restriction ensures that it is valid for replay to save and restore function results for code that is not owned by that user.

The following additional considerations apply to granting privileges on mutable functions:
  If a user has the KEEP privilege granted on mutables values, then the objects inherit mutable access when the SYS_GUID, SYSDATE, and SYSTIMESTAMP functions are called.
  If the KEEP privilege is revoked on mutable values on a sequence object, then SQL or PL/SQL blocks using that object will not allow mutable collection or application for that sequence.
  If granted privileges are revoked between runtime and failover, then the mutable values that are collected are not applied for replay.
  If new privileges are granted between runtime and failover, then mutable values are not captured and these values are not applied for replay.

Definitions

A 'recoverable error" is a class of errors that arise due to an external system failure, independent of the application session logic that is executing. Recoverable errors occur following planned and unplanned outages of foregrounds, networks, nodes, storage, and databases. The application receives an error code that can leave the application not knowing the status of the last operation submitted. Replay re-establishes database sessions and resubmits the pending work for the class of recoverable errors. The replay driver does not resubmit work following call failures due to non-recoverable errors. An example of a non-recoverable error that would not automatically replay is submission of invalid data values. Techniques described herein may re-establish database sessions and resubmit pending work for the class of recoverable errors. Some errors may not be recoverable, and work is not re-submitted for these errors.

A request is a unit of work submitted from the application to a server instance on a database session. The request may include or reference database commands such as SQL and PL/SQL, and other database calls of a single web request on a single database connection. The request may be demarcated by the calls made to check-out and then check-in connections to the database connection from a connection pool. Replaying re-establishes the transactional and non-transactional state for a database session and repeats the request, for recoverable errors.

A "repeatable operation" is a command or set of commands that may be repeated following a recoverable error. For example, an uncommitted transaction or a non-transactional command may be repeated. Replaying the set of repeatable operations re-establishes the non-transactional state for a database session and may repeat an uncommitted database transaction, for recoverable errors. When a request is replayed, the execution appears to the application and client as if the request was slightly delayed. The effect may be similar to a loaded system when the database ran the request slightly slower so that the response to the client is delayed.

In Oracle®, a transaction is committed by updating its entry in the transaction table. Oracle® generates a redo-log record corresponding to this update and writes out this redo-log record. Once this redo-log record is written out to the redo log on disk, the transaction is deemed committed at the database. From the client perspective, the transaction is deemed committed when an Oracle® message (termed Commit Outcome), generated after that redo is written, is received by the client. However, the COMMIT message is not durable. The replay obtains the Commit Outcome available when it has been lost so as to replay transactions no more than once.

"Non-transactional session state" or "NTSS" is state of the session that exists outside or apart from the transaction. NTSS can be created through declarative or procedural mechanisms. Examples of declarative mechanisms are attribute settings for MODULE, ACTION, OPTIMIZER_PLAN, NLS_DATE and so on. Examples of procedural mechanisms are PL/SQL procedures that populate global variables, LOB processing, and AQ processing. Table 1 lists example states that may be set for application users. Example techniques use an application callback to set the initial state, and then work through original calls to chronologically build up the state again.

opaque bind-variable consistency. If the call uses database functions that are mutable including sequence.nextval, SYSDATE, SYSTIMESTAMP, SYSGUID the original values returned from the function execution are saved and at replay are reapplied.

Session State Consistency

A session has a "static" state if all session state changes (e.g. NLS settings, PL/SQL package state) occur as part of initialization and can be encapsulated in a callback at failover.

A session has "dynamic" state if the session state changes are not fully encapsulated by the initialization, cannot be fully captured in a callback at failover, and are otherwise included in one or more commands that execute during the request.

Example Benefits of Restoring Session State

Example benefits may be realized from the various embodiments described herein, but no particular benefit is guaranteed for any particular embodiment. Other benefits that are not specifically named herein may also be realized. Techniques described herein may allow session unavailability to be hidden from the end-user and/or the application, whether the session unavailability is planned or unplanned. A state established for the first session may be recovered or restored to the second session, even in the presence of customized user environments, in-flight transactions, and/or lost outcomes. The techniques may also allow servers to meet target response times for applications regardless of session outages.

TABLE 1.2

Example methods for rebuilding Non-Transactional State

| Classification | Components | Recovered at Replay |
| --- | --- | --- |
| Environment | Application Info Module, Action, Client_ID, etc | Driver sets to last values in use at the time of the outage |
| Environment | Alter session parameters | Rebuild the state by repeating the execution chronologically |
| Environment | Session Parameters | |
| Environment | Events - Debug | Option to resubmit |
| Environment | Resource Management Consumer Groups | Set as part of the user settings. Resource used starts again after failover |
| Application | PL/SQL Variables Tables User defined objects | Rebuild the state by repeating the execution chronologically |
| Application | AQ Subscription | Rebuild the state by repeating the execution chronologically |
| Application | Temporary table data survives for duration of session or transaction | Rebuild the state by repeating the execution chronologically |
| Application | LOB Duration of TEMP Lob's and recreation when in session duration. | Rebuild the state by repeating the execution chronologically |
| Application | Cursor State At transaction boundaries - fetch across Commit only | Rebuild the state by repeating the execution chronologically |
| Application | Result Cache data associated with snapshot | Refresh before returning to capture mode |

"Mutables" is the term used for functions that may change their results each time that they are executed. Mutable functions cause a problem for replay because the results at replay can change. Consider sequence.nextval and sysdate used in key values. If a primary key is built with values from these function calls, and is used in later foreign keys or other binds, at replay the same function result must be returned. Application Continuity provides mutable value replacement at replay for granted Oracle® function calls to provide The first server instance may report an outcome of the last transaction to the client or application, and the second server instance may recover that outcome followed by the in-flight work. The servers may provide support to handle outages in the class where no response is received from the server for a corresponding request to execute commands. The servers may support session recovery requiring less usage of customized exception-handling by the application when that session can be replayed. Recovering the session may be useful even if some replay attempts are not successful. It is true that applications still need to handle errors for cases when replay is disabled. However with replay, most failures should be masked. This results in fewer calls to the application's error handling logic (i.e. less often that the application raises error to user, leaves the user not knowing what happened, or forces the user to re-enter data, or worse that administrators must restart mid-tier servers to cope with the failure, etc.). So overall, replaying should give a better user experience.

Once a user request has been submitted, the user request may be allowed to succeed if the user request can succeed. Following an outage of the database session, the user should not experience the outage if the session can be replayed. An outage in one part of the system should not return an error to the end user or the application. If a transaction failed and is replayable, the request may be replayed in bounded time. If replay succeeds, the successful return status is returned to the application. Outages need not be exposed to the user after communication, system, storage, or site outages even though these outages have been exposed in the past.

Users may be able to define a target response time for work, regardless of outages. Users need not be bothered with lesser service levels for outages. Business sectors such as banking, telecommunications, stock trading, manufacturing, transport, and retail may not tolerate degraded response times, regardless of the underlying reason. Degraded response times may create a competitive disadvantage that is not acceptable. According to various techniques described herein, servers may mask server-side outages from the client, avoiding replay of commands beyond a time threshold to avoid unexpected results.

Example Server-Client Systems for Executing Requests

Many database management systems ("DBMS") provide a transaction-based programming model to application programmers through various client driver interfaces, such as an Oracle Call Interface ("OCI") driver or Java Database Connectivity ("JDBC") driver. Through the drivers, executing the top-level SQL and PL/SQL calls builds the transaction state and non-transactional state of the database session. The client driver may send SQL and PL/SQL calls to the DBMS, and, at the end of the transaction, the changes are committed or rolled back. FIG. 1 shows different components and layers of an example server-client system. In the example, the client driver sends SQL and PL/SQL calls to the DBMS and, at the end of the transaction, the changes are committed or rolled back. As shown, non-transactional and transactional states are built up for the database session, and transactional states are cleared as commits are completed for corresponding transactions.

When using a connection pool, the unit of work is a request. The request comprises check-out from the connection pool, SQL and PL/SQL calls and usually zero or one COMMIT operation. The request ends when the application releases the connection back to the pool. Replay is enabled at the beginning of the request and is disabled at the end of the request. If an outage occurs, replay repeats the request, unless replay has been disabled by a commit if in dynamic mode, or an explicit disable replay application programming interface (API) used by the application for some requests.

In the example of FIG. 1, optionally, if stripes and tags were not fully set, the connection manager sets the stripes and tags for the application. An application signals the beginning of a request, either by checking a connection out from a connection pool or by sending a command that conforms to an application programming interface for marking request boundaries. At the beginning of a request, replay is enabled, and capture under the direction of the database begins. The client sends SQL or PL/SQL to the RDBMS that does not involve transactions. The SQL engine compiles each statement and sends the request to the SQL engine or PL/SQL engine. Executing statements builds up the non-transactional states for the session at the server. The server returns a result set, output binds, DML returning results, function results, and other messages to the client. While replay is enabled, the server piggyback's directives for enqueuing or purging the replay plus the replay context for validating and securing the replay if needed. Some of the results will be held in the client driver and used by the application in its decision making. The client sends a SQL that starts a transaction or PL/SQL containing one or more transactions to the RDBMS. The SQL engine compiles each statement and sends the request to the PL/SQL engine (if PL/SQL) and to the DML driver. This builds up transactional state and further non-transactional state for the database session. The result of the operation including any error message is returned to the client driver. Again, while replay is enabled, the server piggyback's directives plus the replay context. The client sends a commit request to the RDBMS, or the client has set auto-commit that encompasses this request or the PL/SQL has embedded COMMIT. The SQL engine compiles the statement and sends the commit request to the transaction layer. The transaction layer flushes the change records to disk. The success of committing is built post commit and is returned to the client. While replay is enabled, the server piggyback's directives plus the replay plus the replay context. With the COMMIT outcome, the client also receives the next logical transaction identifier (LTXID) that will be used piggybacked on the commit outcome.

The client driver sends a SQL or PL/SQL command to the server and receives the result set error handle containing any error messages, piggybacked directives for replay and replay context. This information is held in memory at the client driver. The application results are forwarded to the application for processing. The application may cache the results and bind values, and continue to use these in future processing of the subsequent queries and transactions. The replay directives are followed by the client driver. The SQL or PL/SQL command and replay context may be held based on the directives.

Without the techniques described herein, if the client entered work and submitted the work to the server, the client expects a present state, potentially with entered data, returned data, and variables cached. If there is an outage due to unavailability of a server-side component or a failed connection between the server and the client, the non-transactional session state that the application needs to operate within would have been lost. If a transaction had been started and committed and had not been issued, the in-flight transaction would be rolled back and would need to be re-submitted by the client. If a transaction had been started and one or more commits had been issued, the commit message that is sent back to the client is not durable. In other words, the client is left not knowing whether the request committed or not, and where in the non-transactional processing state the commands reached during execution.

To accommodate outages, an application could be modified to include custom code for re-connecting, re-establishing non-transactional session state, querying the server to determine what was being executed at the time of failure, and then determining if the work was committed or needs to be repeated. However, any application code module can fail, and developing custom code on an application module-bymodule basis to execute error handling would be prohibitively expensive. Also, in this scenario, there would be nothing general for the client to query to determine whether a transaction has committed or not. Custom checks would probably not accommodate local transactions, distributed transactions, parallel transactions, replicated transactions, and extended architecture or global (XA) transactions. Further, the checked operation can complete after the check is made by the client, and the client could not rely on a result of a client-side check so such a solution is not safe to use.

If a lost transaction is submitted again, a server-client system could preserve atomicity and consistency. The transaction cannot be validly resubmitted if the non-transactional state is incorrect or if it already committed. The transaction cannot be automatically resubmitted if the database has been restored to an earlier point in time, or is a partially replicated copy of the original that no longer contains deciding data.

This embodiment rejects the replay if the database that is used for replaying is a different database, or is the same database but the database has lost committed transactions. This embodiment automatically determines which databases are legal for replay and which are not. This embodiment can account for standalone databases and consolidated databases. It allows replay from a standalone database to the same database plugged into a consolidated database, and when unplugging a database from one consolidated database and plugging it into another. The embodiment always rejects replay if an attempt is made to replay against a different, potentially divergent database.

Example Server-Client Systems for Masking Database Outages

In one embodiment, the Application Continuity architecture defines a protocol between the application and the database such that the transactional and non-transactional database session states are rebuilt if the database session becomes unavailable. When the database session becomes unavailable, is relocated, or becomes unresponsive, the replay drivers, in collaboration with the database, attempt to rebuild the affected database sessions. States at the application or mid-tier have not failed, so the database sessions are rebuilt to where they were before the failure, optionally, validating that client visible results of the application recovery match the pre-outage results as replay progresses and at replay completion.

In one example, when a request times out waiting for a reply and is resubmitted or if the user becomes impatient and resubmits, the replay blocks earlier sessions. The original submission is detected and the most recent one request is committed, any others in-flight for the same request are rejected and roll back.

Figure 3:
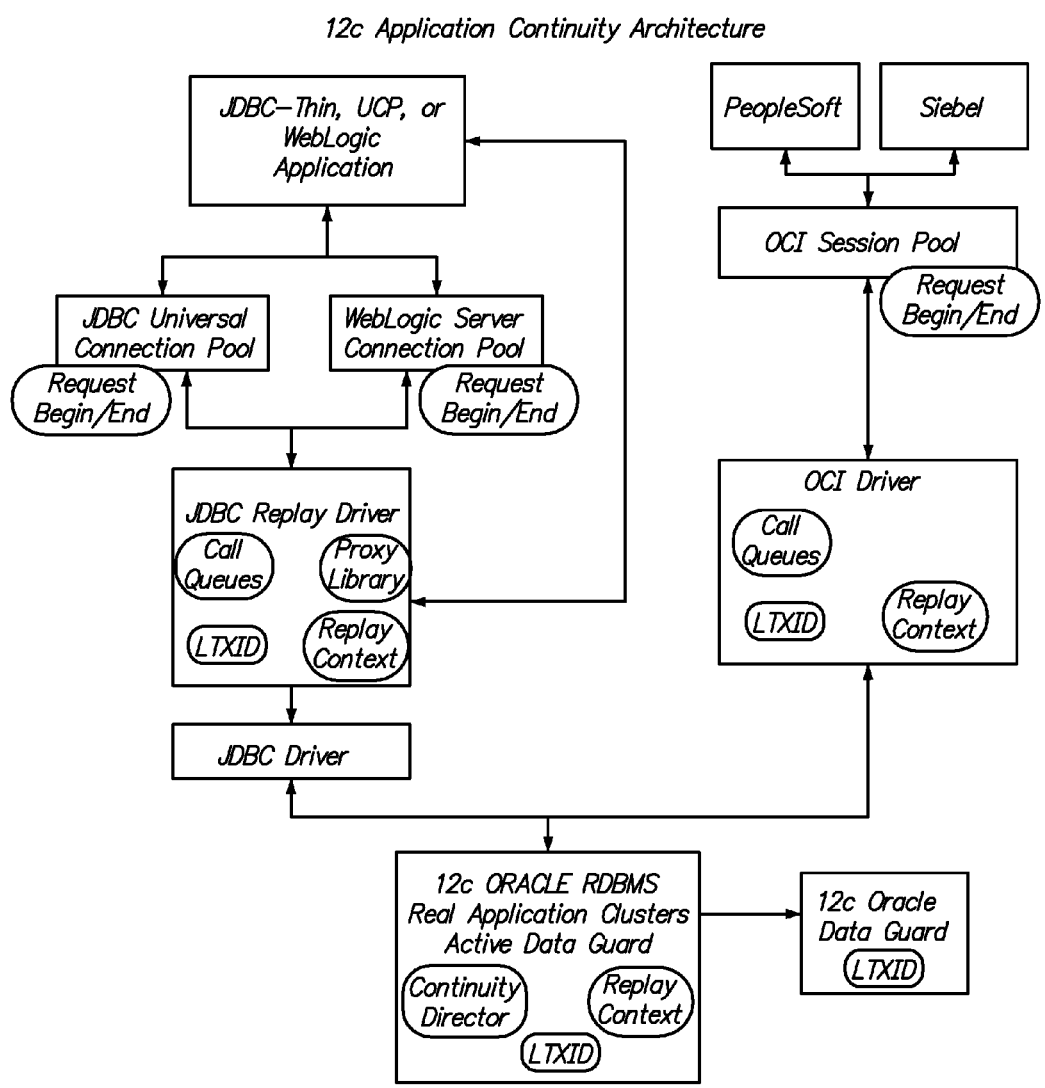
FIG. 3 shows an example architecture and component placement for client-driver replay (termed Replay Driver) and WebLogic Server based replay.

FIG. 3 shows an example architecture and component placement for the client-driver replay (termed Replay Driver) and WebLogic Server based replay. The figure shows the placement for example components that have been configured to deliver replay capabilities. An example server, Oracle 12g RDBMS, manages continuity of database sessions so that the database sessions remain uninterrupted even during an outage of a server instance that served the session. During runtime, the server sends replay context and LTXIDs to the client driver (for example, a JDBC Replay Driver or an Oracle Call Interface Transparent Application Failover (OCI TAF) module as shown), and the client driver holds the LTXIDs and the replay context in case replay is needed. If replay is needed, under the direction of the database, the client driver resubmits each command. The database uses the LTXID to determine if the last request committed, and, if it did not, blocks it from doing so. The database uses the replay context first to validate the security, database, protocol and execution environment at the second session. After replay, the database uses the replay context to check that the user visible results are the same as those from the original execution, and that the execution environment has been rebuilt correctly. Replay progresses with the server validating the fidelity of each replay using the replay context. This process allows the replay driver and server to collaborate restoring the transactional and non-transactional on a second session, if the first server becomes unavailable. The replay may be repeated on a third or fourth session continuing until the replay succeeds. If replay succeeds, the process returns to capturing the request again. If replay is not possible, the original error is returned to the application or client together with the known outcome committed or not.

Sample Architecture Components

The following components of Application Continuity may work together to execute capture and replay:

The replay drivers intercept execution errors and, when these errors are recoverable, automatically replay the user calls from the beginning of the request. When successful, the replay appears to the application as a delayed database interaction.

In collaboration with the database, the replay drivers maintain a history of calls during a conversation between a client and the database. For each call made at run time, the driver retains the context required for a subsequent replay.

The continuity director directs the run time and replay, collaborating with the replay drivers as to what. The director knows what is repeatable and how it should be repeated, and applies this knowledge as follows:

During run time, saving protocol and validation information (and mutables sufficient for replaying), or directing the replay drivers to keep or purge calls During replay, rejecting a replay that:
Runs on a different database or a database that has lost transactions and potentially diverged
Violates protocols
Fails to reproduce the same client-visible data (rows, out binds, error codes, and messages) that the application or client saw and potentially made decisions on during the original execution The replay context is opaque information that the database returns to the client driver during normal application run time. The replay drivers save the context with each SQL or PL/SQL call that the drivers have been instructed to hold. The replay context contains sufficient knowledge to protect and validate replay of each call, and to apply mutables when mutable values have been retained. When a call is no longer needed for replaying the session, the replay context is discarded along with the call itself.

Example Replay Drivers

The JDBC Replay Driver and OCI Transactional Application Failover (both referred to here as Replay Drivers) are example components of Application Continuity for replaying lost work following recoverable database outages.

The Replay Drivers maintain a history of calls during a client conversation with the database, as instructed by the Continuity Director. Each replay driver maintains queues of calls, and for each call kept at runtime keeps the Replay Context needed for a later replay. The replay duration is limited by releasing accumulated history at end of request (normally, check-in to a driver pool), when replay is explicitly disabled, and at identified end of requests. A Replay Driver records the call history for the duration of each request, purging closed calls for completed requests, and SELECT calls and completed transactions for applications that are identified to not change non-transactional session state during a request, under the direction of the Continuity Director. In another implementation the retained history is marked for release during a request, and releases occur at the end of request or as needed by the garbage collector.

Following any outage of the session that is due to a loss of database service, planned or unplanned, the replay drivers rebuild the non-transactional and transactional database session states. A replay driver establishes a new session, so that there is no residual state, issues an optional callback allowing the application to re-establish initial state for that session (if the callback is registered), and then re-executes the saved call history accumulated during runtime. The replay of calls comes from driver queues and can be repeated chronologically or in a lazy fashion depending on how the application changes the database state. The replay is under the direction of the Continuity Director component. Each replayed call may be checked to ensure that it returns exactly the same client visible state that were seen and potentially used by the application in its decision making at the original execution. Each replayed call may also be checked to determine whether the call passes pre-replay and post-replay checks at the database in order for the replay to be accepted and finalized.

In one embodiment, replay protects the consistency of SQL and PL/SQL statements (including within transactions) by passing the Replay Drivers the original mutable values in an opaque context area, called the Replay context, during the original execution of each database operation. The Replay context is saved by the Replay Drivers with the method call corresponding to the database operation, and is returned to the database server with each matching database operation during the replay. The Replay context is used to restore the original values of transient SQL function results when that function call is made at the server-side. Using this mechanism, original values are restored ensuring that the original value is used in the replayed query and the same values are returned as the result of the query. This occurs with minimum cost to the Replay Drivers.

At-most-once transaction execution is protected by the LTXID. Transactions are only resubmitted when the error is recoverable and the outcome for the transaction is confirmed as not committed by the last LTXID that was in use. The LTXID on the session that has been replaced at replay is now the LTXID that is in effect for the request. If the new session fails, then the latest LTXID in use is that which is checked for "at-most-one execution". All others have been blocked by previous replay attempts.

The Continuity Director, using the information in the Replay context, rejects the replay if there is any mismatch in outcome. This includes all data that is returned on the wire including out binds, DML returning, error codes and error messages. This rejection ensures that all data that the application potentially made decisions upon are re-established—namely, rows are returned in the same order as the original execution, that the outcomes—in out binds (e.g. DML returning and PL/SQL procedure and function results, error codes and error messages) and row sets are the same as the original execution, and that SQL defines, in-binds, and execution environment are the same as the original execution. Any divergence results in the replay being aborted, and if in a transaction, that transaction is rolled back. The failed-over session and session state (apart from the transaction) are left as is, allowing the application to take its own recovery action. In one embodiment, the responsibility of validation is moved to the client side when the Replay Context is not available.

The Replay Drivers may record the history for the duration of the request, purging closed method call for completed queries and closed transactions if operating in static mode, or if state is known not to have changed in the transaction or not to be relied on in after the transaction when operating in dynamic mode. The replay duration is limited by purging closed cursors after SELECT calls have completed if those SELECT statements did not change state, if replay has been disabled, and at the end of the request.

Example features provided below are integrated with the Replay Drivers to support a correct replay with acceptable cost to runtime performance.

Example Continuity Director

In one embodiment, a Continuity Director causes the database server to direct the runtime and replay parts of the feature. The objective is for the database server to collaborate with the client-side replay drivers as to what to do. This has the possible advantages that the decision-making is in one place for all replay drivers, the decision is in a place that has access to the information (such as non-transactional state changes, embedded and top-level commits, rollback, administrative calls etc), and that place is extensible for all replay drivers. In one embodiment, the logic for handling replayable patterns, for what the replay drivers place in their queues, and when to purge, exists in the database server. In other embodiments, the logic may be distributed among several components of the database system or may exist on an entirely different component of the database system. For example, the replay drivers let the Continuity Director know where requests begin and end, when input streams cannot be rewound and so replay is disabled, and when the application executes an explicit disable replay API.

The Continuity Director solution encapsulates the knowledge regarding what is repeatable, rather than what is not repeatable. In one embodiment, information indicating what is playable is a white list of replayable items rather than a black list of non-replayable items. This knowledge is applied at runtime by the Continuity Director to direct the client drivers to keep or purge calls, and at replay to reject replay that is to a divergent database, violates protocols, or does not reproduce agreed states (amongst other things). The Continuity Director works in unison with the replay context at runtime to save security credentials, database signature, stateful-ness information, cursor environment, execution system change number (SCN), and the checksum for client visible results. These data are used to determine whether replay will be allowed, and if replay is allowed whether that replay is valid. At replay, the cursor environment and execution SCN are re-established or validated for each call using the information held in the replay context for that round trip.

The continuity director layer is placed in the RDBMS' call processing management layer. This allows a complete picture of calls into and out of the database to the replay drivers.

Examples of Purging Information

In order to conserve memory consumption, the Replay Drivers may purge recorded calls that are no longer needed for replay. Applications may properly and timely close ResultSets and Statements following use, via standard JDBC and OCI calls.

The JDBC and OCI Replay Drivers would purge stored call history and all replay-specific objects (such as in-binds, replay context) that are related to a Call (including PreparedStatement and CallableStatement), when that Statement is closed and there is no bounding active transaction, and that statement made no changes to the database non-transactional session state and on request end, when that connection is returned to the pool.

The Replay Drivers will also provide a History-Purging API that allows applications to purge the stored call history that has been marked for release within the Replay Drivers prior to the purge point. This helps to further conserve memory consumption, in case applications do not or do not timely close Result Sets and Statements or keep using the same connections for an extended period of time without returning them to the pool. This API only purges stored operation history that has been marked for release. It does not involve altering a connection's state by re-executing any JDBC method, SQL, or PL/SQL. It does not purge history that has not been marked for release.

Example Replay Context

In one embodiment, the security, and consistency of the database session is protected at replay by passing to the Replay Drivers, during the original execution of each top-level call, an opaque context area called the Replay Context. The Replay Context is saved by the Replay Drivers with the queued SQL or PL/SQL call corresponding to the top-level database operation. The replay context is returned to the database server with each matching database operation during a replay.

The replay context carries the knowledge to validate the security, compatibility, validity, correctness of replay, and to optimize the replay. The replay context may contain the mutable values that were used for original function executions, the checksum for data exposed to the application, a protocol checksum for security and protocol validation, the keys for transactional result sets, and the optimizers' execution plan. Most of the time, the replay context contains the database signature, scn, checksum and protocol checksum only. The replay context may be provided to the replay drivers as a whole or as a delta of the last starting from the beginning of the request In one embodiment, an instance of the replay context may contain some combination of the following knowledge to support replay/migration of in-flight work.

Database signature for determining the relative point in time of the database at the time that the original call executed (DBID, DBINC, timestamp, consolidated database SCN).

Ownership, transaction signature (LTXID), and call order to protect against tampering with the replay and against protocol violations—bugs or intentional.

SCN to optimize replay when browsing at original database.

Checksum of visible results that were sent to the client on first execution. The database-based checksum offloads checksum calculation from the client-drivers and provides immediate database-side rejection at mismatch at replay. The checksum may take advantage of hardware—based calculations when these are available. The checksum algorithm is compatible between hardware and software, and across ports and versions to support failover and migration of database sessions.

Output for selected ORACLE function calls to support visible result consistency (termed mutable support).

Version related tuples to provide detection of LOB/BLOB/CLOB and Secure file changes for media types that rarely change, avoiding the process of scanning and creating checksums on Gigabytes of large object data.

DBID-Rowid-Row version tuples to provide opaque optimistic locking in transaction replay.

Optimizer execution plan to safeguard output order for SELECT replay when ORDER BY is not part of the original SQL statement.

In one embodiment, the replay context uses universal format to handle endian, version, and port changes between original and failover target.

The Continuity Director uses the replay context to support security, and correctness of the replay. When replay is enabled, the Replay Context is returned as an opaque object to the client with every call. The replay is rejected if there is a mismatch outcome, after applying any mutable values and SCN, and after comparing the checksums accrued for the client visible results against that for the original call (contained in the replay context). The validation includes—that rows are returned in the same order as the first submission for the portion of the row set that the application has seen; that the outcomes in out binds (e.g. DML returning and PL/SQL procedure and function results and error codes and messages) are the same; and that row sets size and any error codes are the same as the original submission. Divergence results in the replay being aborted, and if in a transaction, that transaction is rolled back.

Example Transaction Idempotence Component

The Continuity Director uses transaction idempotence in order to prevent duplicate transactions. During normal runtime, an LTXID is automatically held in the session at both the client and server. At commit, the LTXID is persisted as part of committing the transaction, and an updated LTXID is returned to the client.

At replay for each session failing over, the Continuity Director receives the last LTXID in-use for that session and, if that call had the capability to commit information, calls a FORCE_OUTCOME api to determine the outcome of the last call on that session. The FORCE_OUTCOME call may involve blocking the LTXID from committing so that the outcome is known and cannot be duplicated by an in-flight transaction (i.e., a transaction still executing on another server). Blocking the LTXID from committing supports replay fidelity should a transaction using that LTXID be in flight. GET_LTXID_OUTCOME that internally calls FORCE_OUTCOME is called before attempting driver-based or Web-Logic Server-based replays, to prevent multiple executions of a single transaction.

As an optimization, FORCE_OUTCOME, or GET_LTXID_OUTCOME, is not called if the last call from the session that died could not execute a commit. For example, the last call was a SELECT, or an INSERT, UDATE or DELECT with auto-commit mode not set, or the session that died was operating against a read-only service or database.

The transaction idempotence component delivers integrated functionality that provides the idempotence automatically and transparently to applications. In one embodiment, the transaction idempotence component includes some combination of the following features.

Durability of COMMIT outcome by saving a LTXID at COMMIT for all transaction types against database. This includes idempotence for transactions executed using auto-commit, from inside PL/SQL, from inside server side Java, from remote and distributed transactions and from callouts that cannot otherwise be identified using generic means.

Using the LTXID to support at-most-once execution semantics such that database transactions protected by LTXIDs cannot be duplicated regardless of whether there are multiple copies of that transaction in flight.

Blocking COMMIT of in-flight work to ensure that regardless of the outage situation, another submission of the same transaction for example by a browser or mid-tier cannot commit.

Identifying whether work committed at a LTXID was committed as part of a top-level call (client to server), or had other complexities, such as (a) being embedded in a procedure such as PL/SQL or Java at the server, or (b) being in a call that may have had other results or effects that may have been lost. An embedded commit state indicates that while a commit completed, the entire procedure in which the commit executed may not have run to completion. Any work beyond the commit cannot be guaranteed to have completed until that procedure itself returns to the database engine, and the client cannot find out unless those results reached the client or were known and persisted with the transaction outcome.

Identifying if the database to which the COMMIT resolution is directed is ahead of, in-sync, or behind the original submission and rejecting when there are gaps in the submission sequence of transactions from a client. It is deemed an error to attempt to FORCE idempotence if the server or client are not in sync in transaction order as determined by the LTXID sequence.

A callback on the client driver that fires when the LTXID is incremented by a call from the client to the server. This is used to access the LTXID for higher layer applications such as WebLogic and third parties in order to maintain the current LTXID ready to use to block duplicate submissions.

Namespace uniqueness across globally disparate databases and across databases that are consolidated into a pluggable infrastructure. This includes RAC, Data Guard, Golden Gate, and Pluggable Databases.

Example Methods for Masking Database Outages

FIG. 1 shows an example server-client workflow for recording work at replay driver level, directing the driver, managing replay context, and achieving transaction idempotence. The flow shows query and transaction handling. Replay is available, unless it has been explicitly or implicitly disabled, between begin request and end request.

Figure 2:
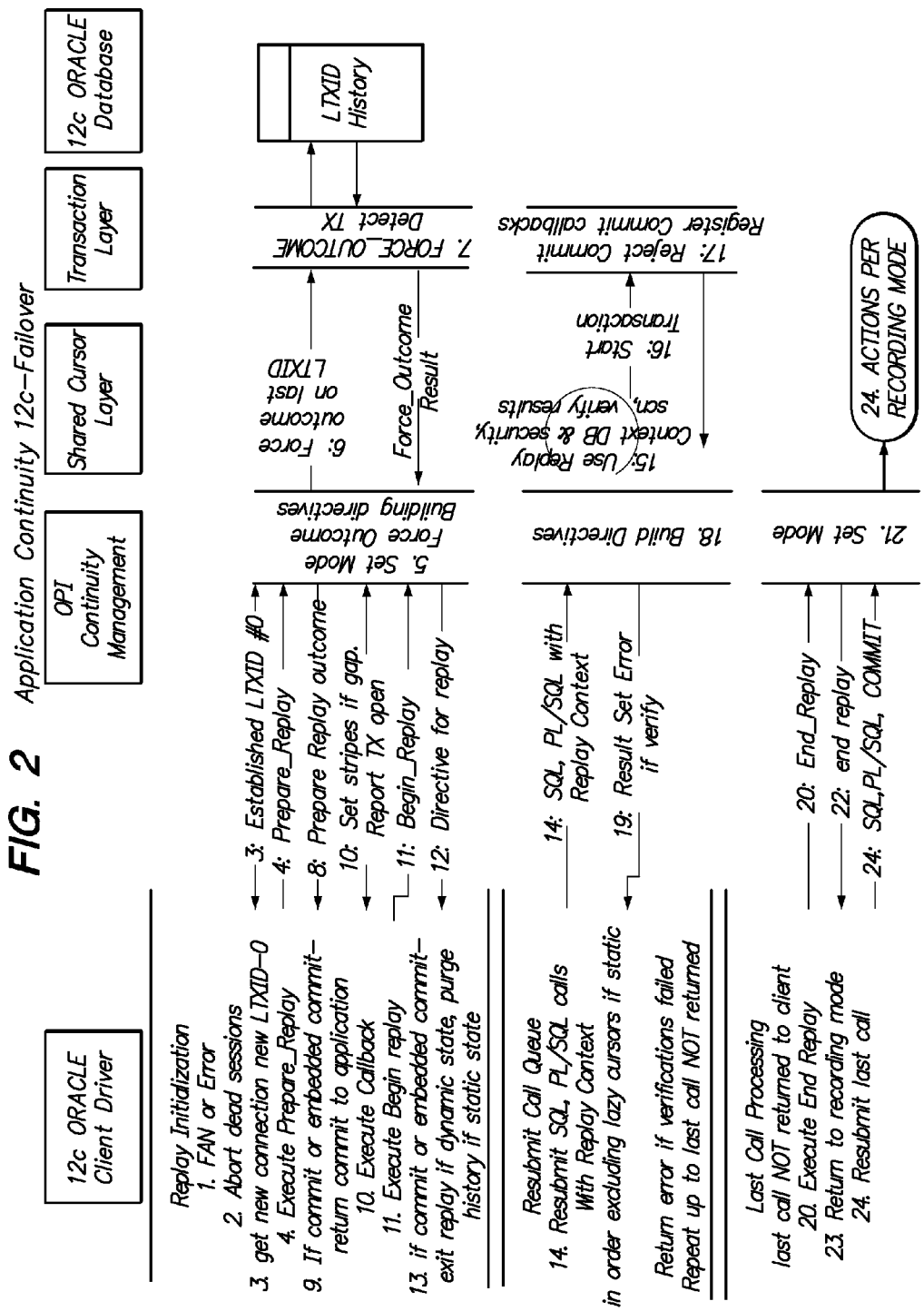
FIG. 2 shows an example server-client workflow for failover for a database system driven by Continuity Management, Replay Driver and idempotence protocols for achieving at-most once execution of transactions.

FIG. 2 shows an example server-client workflow for failover for a database system driven by Continuity Director, Replay Driver and idempotence protocols for achieving at-most once execution of transactions.

In order to recover an application session from a database server outage, the conversation for that session is replayed from the beginning of the request based at least in part on the status of the session's conversation at the time of the outage. For example, the application session may be reading outside a transaction, in a transaction, completing a transaction with commit or rollback. The server-client system is able to re-establish the non-transactional state such as NLS attributes, transactional state, PL/SQL package globals, etc. to where they were at the time of the outage. The server-client system is also able to re-execute a transaction in the right environment, if the transaction was in-flight and did not commit. The server is able to restore mutable function values if these have been permitted.

To minimize impact on the application, the replay driver attempts to put the database session back to where it would have been had the original execution been delayed. The approach to replay is to first determine the status of the in-flight transaction in that database session if that transaction could have committed at the time of the outage. Then, once the status of the in-flight conversation is known, to resume the application from a consistent state in which the components such as the browser, application, mid-tier, database driver, and database session are aligned.

Replay includes determining the last committed status of that session if commit was possible. The last part of the conversation may have been a simple top-level call such a DML, COMMIT, or a PL/SQL block that started and potentially executed one or more COMMITs. The LTXID is the key to this step. The last used LTXID is passed in a Prepare_Replay call to the server. At runtime the server has kept a record of transactions executed for that LTXID. The first step of replay is to obtain a new session (new so that the state is clean) and to use the LTXID and last SQL or PL/SQL call to ascertain the conversation status at the outage. If that last SQL or PL/SQL call could not have committed then this step returns an uncommitted status.

Once the status is known, if a callback has been registered, the next step is to allow the application to restore basic end user state, such as NLS settings, security attributes, etc., that are more or less constant across requests from the same end user. This step is used when using static state, where state is established at the beginning. It is optional when using dynamic state, but using callouts, such as UCP labeling to set the state does provide better performance as there is no need to re-establish state at the start of every request. When a callback is registered it may be executed at runtime and at a replay, or at replay only depending on its implementation.

Subsequent steps re-execute the calls that created the session state and transaction state (if there was a transaction). These steps replay the calls of the current request, or that subset of calls necessary to restore the most recent session state and transactions state, e.g. the calls of the current transaction, but not those of previous transactions or requests. The replay of each call is supported by the replay context that is used to validate the database incarnation, protocol (aka replay is in correct order), outcomes, to restore values for ORACLE functions that would otherwise lead to mismatches at replay, to optimize the replay, and to validate the environment.

Example Rules for Replaying when PL/SQL is Present

In one embodiment without support for idempotence, when a Replay Driver sees a transaction started or the last call is PL/SQL at the top-level, recording of history ceases and the recording history is purged. This is because that PL/SQL could commit a transaction.

In one embodiment with support for PL/SQL replay in current mode, replay switches to current mode once PL/SQL has been seen and no longer uses SCN because it is not valid to go backwards in time.

Applications may execute and commit transactions for connection initialization. So long as the transaction is committed in the callback, this is valid to replay.

For non-transactional state, history is held for calls executed that did not result in the transaction bit (aka. non-transactional) being set following execution. Before PL/SQL is seen, while replaying SELECT statements, the replay driver uses consistent mode—replaying "as of" the original SCN. This is an optimization to minimize rejection rate due to current mode. The optimization supports new modules written to be database independent.

If the replay driver reaches top-level PL/SQL, replay ceases using original SCN and all subsequent calls, SELECT and PL/SQL run in current mode. The behavior is as if the submission is delayed. SELECT calls may not be purged at runtime, even if closed once in current mode replay. Replay re-executes and then closes previously closed cursors again. Purge at end of http request and at transaction close is unchanged. In this read-only solution, at replay, COMMIT may be disabled for all calls excluding the last call made.

With idempotence supported automatically by Transaction Guard, for transactional state, recording may continue beyond the non-transactional phase, through the transaction until COMMIT is successful. Once in a transaction, SELECT, DML, and PL/SQL always execute in current mode. If the transaction did not commit, whether Pl/SQL is present or not, the replay driver can play through, with the transaction in current mode. DML and PL/SQL executes at current mode. After a successful COMMIT, if using dynamic state, and state was changed in a committed transaction, for example by PL/SQL, then replay is disabled for that request and remains disabled until the next request begins. After a successful COMMIT when using dynamic state, replay is disabled and all history, excluding Open cursors, outside transactions is purged. Conversely, if using static state, the application has stated or it has been detected that it does not change state after setup or changes state and this state is not relied on after commit. In which case, just that transaction is purged, and replay stays enabled until the request ends.

During replay, COMMIT may be disabled for all calls excluding the last call made. This is to avoid commit boundaries changing during the replay. Before the last call, COMMIT is re-enabled. The last call did not return to the client, so the client has not made a decision based on it. It did not already commit because they has been verified by the LTXID processing.

In one embodiment, history recording resumes at next begin request marker. Both eBusiness Suite (when marked as able to lose the connection) and Fusion Applications UI operations are examples of application s that are stateless between requests but continue to hold the physical connection. For connection pools, the ORACLE pools implicitly mark the beginning and end of requests at check-out and check-in respectively. This tells the replay drivers when to enable replay and to start recording, and when to disable replay and stop recording. New published API's beginRequest and endRequest allow other third party connection pools to mark requests at check-in and check-out. Standalone applications can to mark where requests begin and end using these APIs.

When replay occurs, the entire request is replayed up to where the outage occurs, and then continues with the remainder of the request. The execution appears to the user, application and client as if the request was slightly delayed. The effect is similar to a loaded system when the database ran the request slightly slower so that the response to the client is delayed. In one embodiment with support for PL/SQL replay in consistent mode, non-transactional state is maintained for calls executed that did not result in the transaction bit being set. While replaying SELECT statements, the replay driver uses consistent mode—replaying 'as of' the original SCN. If the replay driver reaches top-level PL/SQL that is non-transactional (i.e., did not open a transaction at original execution), replay sets the session SCN to the original SCN, and replays that PL/SQL and its children at that SCN.

For transactional state, recording and replay may continue through the transaction phase until COMMIT. All calls in a transaction, SELECT, DML, and PL/SQL are replayed at current SCN. If the transaction did not commit, whether Pl/SQL is present or not, the replay driver can play through, with the transaction in current mode. DML and PL/SQL executes at current SCN. After a successful COMMIT, if the replay is determined to be using dynamic state, then replay may be disabled when that COMMIT succeeds. Once disabled, replay remains disabled until the end of the request. This is not a significant problem because most requests contain zero or one commit, and that COMMIT, when present, is often immediately followed by an end request and check-in back to the connection pool. When there is a state change, some solutions can detect that this state change is not relied on after the transaction commits. If a state change is detected in a committed transaction and is relied on, a third set of commands could be maintained to re-establish that state. The solution replays past COMMIT if determined to be using static state.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
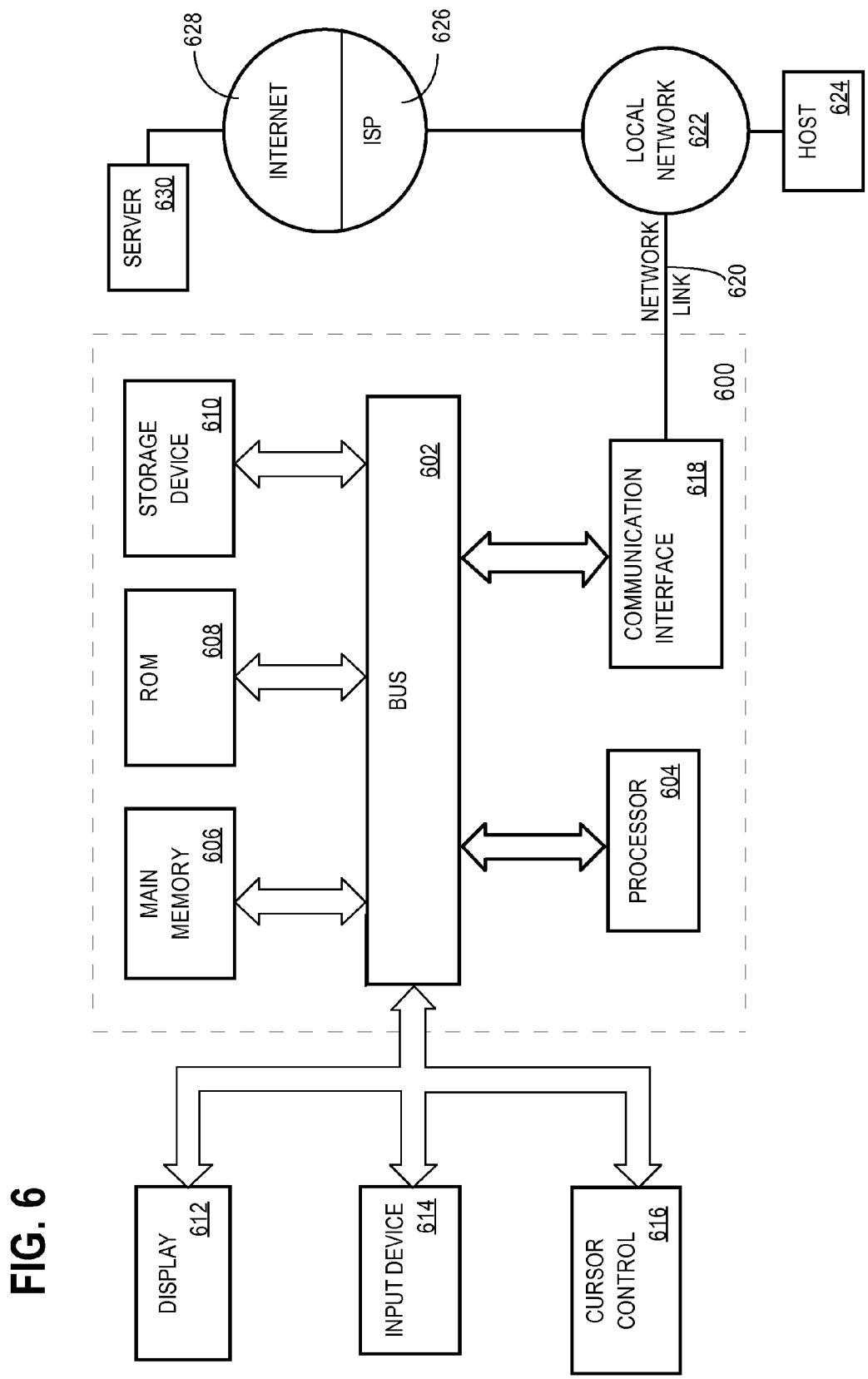
FIG. 6 illustrates an example computer system that may be specially configured to perform example methods described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, an optical disk, or a solid-state drive, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
 a server instance receiving, from a client in a session between the server instance and the client, a request to execute:
  one or more transactional commands that, when executed, cause changes to a database, and
  one or more non-transactional commands that, when executed, do not cause changes to the database;
 the server instance sending, to the client, at least one first directive instructing the client to store one or more first items representing one or more particular transactional commands that are open but not yet committed in the session in a first set of information and to store one or more second items representing one or more particular non-transactional commands that have been processed in the session in a second set of information;
 determining that the one or more particular transactional commands have committed in the session; and
 based at least in part on determining that the one or more particular transactional commands have committed in the session, the server instance sending, to the client in the session, at least one second directive instructing the client to purge, from the first set of information, the one or more first items that represent the one or more particular transactional commands without purging, from the second set of information, the one or more second items that represent the one or more particular non-transactional commands;

wherein the method is performed by one or more computing devices.

2. The method of claim 1, further comprising:

determining that the request has completed in the session;

based at least in part on determining that the request has completed in the session, the server instance sending, to the client in the session, a third directive instructing the client to purge, from the second set of information, the one or more second items that represent the one or more particular non-transactional commands.

3. The method of claim 2, wherein the third directive instructs the client to purge, from the first set of information, the one or more first items that represent any transactional command.

4. The method of claim 1, wherein the at least one first directive comprises at least one directive instructing the client to store, in the second set of information, the one or more second items that represent the one or more particular non-transactional commands.

5. The method of claim 4, further comprising:

determining that the particular one or more non-transactional commands have been processed in the session;

based at least in part on determining that the particular one or more non-transactional commands have been processed in the session, the server instance sending, to the client in the session, one or more directives instructing the client to maintain, in the second set of information, the one or more second items that represent the one or more particular non-transactional commands.

6. The method of claim 1, wherein a first data structure is used to store the first set of information is stored; and wherein a second data structure is used to store the second set of information.

7. The method of claim 6, wherein the first data structure is a first queue and the second data structure is a second queue.

8. The method of claim 1, wherein the session has a static state indicating that session state changes for the session occur as part of session initialization or outside of any transaction; and wherein the server instance sends the at least one second directive in response to committing any transaction in the session.

9. The method of claim 1, further comprising:

detecting that a transaction in the request sets a non-transactional session state;

determining whether later commands in the request use the non-transactional session state;

if it is determined that later commands do not use the non-transactional session state, after committing the transaction, the server instance sending, to the client in the session, at least one directive instructing the client to purge, from the first set of information and the second set of information, the one or more first items that represent the one or more particular transactional commands and the one or more second items that represent the one or more particular non-transactional commands; and if it is determined that later commands use the non-transactional session state, after committing the transaction, the server instance sending, to the client in the session, a directive instructing the client to purge, from the first set of information, the one or more first items that represent the one or more particular transactional commands.

10. The method of claim 1, further comprising:

the server instance detecting that one or more transactions of the request are committed;

the server instance detecting that later commands use a session state that was changed during the one or more committed transactions of the request but was not persisted by the one or more transactions;

in response, the server instance sending, to the client in the session, a third set of information describing one or more commands that change the session state without repeating the one or more committed transactions; and the server instance sending, to the client in the session, a directive instructing the client to purge from the first set of information, the one or more first items that represent the one or more particular transactional commands.

11. One or more non-transitory storage media storing one or more sequences of instructions which, when executed by one or more computing devices, cause:

a server instance receiving, from a client in a session between the server instance and the client, a request to execute:

one or more transactional commands that, when executed, cause changes to a database, and one or more non-transactional commands that, when executed, do not cause changes to the database;

the server instance sending, to the client, at least one first directive instructing the client to store one or more first items representing one or more particular transactional commands that are open but not yet committed in the session in a first set of information and to store one or more second items representing one or more particular non-transactional commands that have been processed in the session in a second set of information;

determining that the one or more particular transactional commands have committed in the session; and based at least in part on determining that the one or more particular transactional commands have committed in the session, the server instance sending, to the client in the session, at least one second directive instructing the client to purge, from the first set of information, the one or more first items that represent the one or more particular transactional commands without purging, from the second set of information, the one or more second items that represent the one or more particular non-transactional commands.

12. The one or more non-transitory storage media of claim 11, wherein the one or more sequences of instructions include instructions which, when executed by the one or more computing devices, cause:

determining that the request has completed in the session;

based at least in part on determining that the request has completed in the session, the server instance sending, to the client in the session, a third directive instructing the client to purge, from the second set of information, the one or more second items that represent the one or more particular non-transactional commands.

13. The one or more non-transitory storage media of claim 12, wherein the third directive instructs the client to purge, from the first set of information, the one or more first items that represent any transactional command.

14. The one or more non-transitory storage media of claim 11, wherein the at least one first directive comprises at least one directive instructing the client to store, in the second set of information, the one or more second items that represent the one or more particular non-transactional commands.

15. The one or more non-transitory storage media of claim 14, wherein the one or more sequences of instructions include instructions which, when executed by the one or more computing devices, cause:
   determining that the particular one or more non-transactional commands have been processed in the session;
   based at least in part on determining that the particular one or more non-transactional commands have been processed in the session, the server instance sending, to the client in the session, one or more directives instructing the client to maintain, in the second set of information, the one or more second items that represent the one or more particular non-transactional commands.

16. The one or more non-transitory storage media of claim 11,
   wherein a first data structure is used to store the first set of information is stored; and
   wherein a second data structure is used to store the second set of information.

17. The one or more non-transitory storage media of claim 16, wherein the first data structure is a first queue and the second data structure is a second queue.

18. The one or more non-transitory storage media of claim 11,
   wherein the session has a static state indicating that session state changes for the session occur as part of session initialization or outside of any transaction; and
   wherein the server instance sends the at least one second directive in response to committing any transaction in the session.

19. The one or more non-transitory storage media of claim 11, wherein the one or more sequences of instructions include instructions which, when executed by the one or more computing devices, cause:
   detecting that a transaction in the request sets a non-transactional session state;
   determining whether later commands in the request use the non-transactional session state;
   if it is determined that later commands do not use the non-transactional session state, after committing the transaction, the server instance sending, to the client in the session, at least one directive instructing the client to purge, from the first set of information and the second set of information, the one or more first items that represent the one or more particular transactional commands and the one or more second items that represent the one or more particular non-transactional commands; and
   if it is determined that later commands use the non-transactional session state, after committing the transaction, the server instance sending, to the client in the session, a directive instructing the client to purge, from the first set of information, the one or more first items that represent the one or more particular transactional commands.

20. The one or more non-transitory storage media of claim 11, wherein the one or more sequences of instructions include instructions which, when executed by the one or more computing devices, cause:
   the server instance detecting that one or more transactions of the request are committed;
   the server instance detecting that later commands use a session state that was changed during the one or more committed transactions of the request but was not persisted by the one or more transactions;
   in response, the server instance sending, to the client in the session, a third set of information describing one or more commands that change the session state without repeating the one or more committed transactions; and
   the server instance sending, to the client in the session, a directive instructing the client to purge from the first set of information, the one or more first items that represent the one or more particular transactional commands.

* * * * *

UNITED STATES PATENT AND TRADEMARK OFFICE
CERTIFICATE OF CORRECTION

PATENT NO. : 9,591,103 B2
APPLICATION NO. : 14/748451
DATED : March 7, 2017
INVENTOR(S) : Neel et al.

It is certified that error appears in the above-identified patent and that said Letters Patent is hereby corrected as shown below:

On page 2, Column 1, under Related U.S. Application Data, Line 7, delete "13/448,287," and insert -- 13/448,267, --, therefor.

In Column 16, Line 34, delete "'recoverable error'" and insert -- "recoverable error" --, therefor.

In Column 25, Line 38, after "request" insert -- . --.

In Column 26, Line 49, delete "UDATE or DELECT" and insert -- UPDATE or DELETE --, therefor.

In Column 29, Line 9, delete "Pl/SQL" and insert -- PL/SQL --, therefor.

In Column 29, Line 34, delete "application s" and insert -- applications --, therefor.

In Column 29, Line 65, delete "Pl/SQL" and insert -- PL/SQL --, therefor.

Signed and Sealed this
Twenty-ninth Day of August, 2017

Joseph Matal
*Performing the Functions and Duties of the
Under Secretary of Commerce for Intellectual Property and
Director of the United States Patent and Trademark Office*